(12) United States Patent
Al-Eryani et al.

(10) Patent No.: US 12,348,980 B2
(45) Date of Patent: Jul. 1, 2025

(54) CELL-FREE WIRELESS COMMUNICATION NETWORK FOR COMMUNICATING WITH DISTRIBUTED USERS AND RELATED METHODS

(71) Applicant: UNIVERSITY OF MANITOBA, Winnipeg (CA)

(72) Inventors: Yasser Al-Eryani, Winnipeg (CA); Ekram Hossain, Winnipeg (CA)

(73) Assignee: University of Manitoba, Winnipeg (CA)

( * ) Notice: Subject to any disclaimer, the term of this patent is extended or adjusted under 35 U.S.C. 154(b) by 295 days.

(21) Appl. No.: 18/158,567

(22) Filed: Jan. 24, 2023

(65) Prior Publication Data

US 2023/0328536 A1 Oct. 12, 2023

Related U.S. Application Data

(60) Provisional application No. 63/302,710, filed on Jan. 25, 2022.

(51) Int. Cl.
*H04W 16/18* (2009.01)
*H04W 16/28* (2009.01)

(52) U.S. Cl.
CPC ........... *H04W 16/18* (2013.01); *H04W 16/28* (2013.01)

(58) Field of Classification Search
CPC ..... H04W 16/18; H04W 16/28; H04W 88/18; H04B 7/0617
See application file for complete search history.

(56) References Cited

U.S. PATENT DOCUMENTS

| | | | | |
|---|---|---|---|---|
| 2018/0235013 | A1* | 8/2018 | Jung | H04W 74/0833 |
| 2022/0321179 | A1* | 10/2022 | Mungara | H04B 7/024 |
| 2023/0155797 | A1* | 5/2023 | Xie | H04W 72/20 |
| | | | | 370/329 |
| 2023/0254814 | A1* | 8/2023 | Sha | H04W 52/0229 |
| | | | | 455/458 |
| 2023/0308137 | A1* | 9/2023 | Townend | H04W 36/085 |
| 2023/0318667 | A1* | 10/2023 | Frenger | H04L 5/006 |
| | | | | 370/330 |
| 2023/0412220 | A1* | 12/2023 | Kiani | H04W 52/42 |

(Continued)

*Primary Examiner* — Kenneth T Lam
(74) *Attorney, Agent, or Firm* — Kyle R Satterthwaite; Ryan W Dupuis; Ade & Company Inc.

(57) ABSTRACT

A wireless communication network comprises access points distributed across a geographical area and configured to wirelessly communicate with distributed user devices in the area, and a central server communicatively connected to the access points and configured to control the network. The access points are grouped, based on channel state information, to form a plurality of communication clusters each in wireless communication with a subset of the user devices in geographically proximal location thereto, and each communication cluster and its subset of user devices forms a subnetwork. The subnetworks are arranged for wireless communication in non-overlapping portions of the geographical area. The access points of a common subnetwork are configured to wirelessly exchange data with the subnetwork's user devices using a common frequency range. Each communication cluster comprises an edge computing device formed by one or more of the access points belonging thereto and configured to exchange data with the server.

19 Claims, 11 Drawing Sheets

(56) References Cited

U.S. PATENT DOCUMENTS

2024/0063886 A1* 2/2024 Fresia .................. H04L 5/0007
2024/0250725 A1* 7/2024 Mate ................... H04B 7/0452
2024/0381131 A1* 11/2024 Pinho Fernandes .. H04W 72/23

* cited by examiner

CELL-FREE WIRELESS COMMUNICATION NETWORK FOR COMMUNICATING WITH DISTRIBUTED USERS AND RELATED METHODS

This application claims the benefit under 35 U.S.C. 119(e) of U.S. provisional application Ser. No. 63/302,710 filed Jan. 25, 2022, which is incorporated by reference herein.

FIELD OF THE INVENTION

The present invention relates to a cell-free wireless communication network and related methods for forming such a network and for forming antenna beams of access point in such a network.

BACKGROUND

Cell-free (or cell-less) network architectures are envisioned to increased coverage and transmission rates in future generation wireless systems [1]. In a cell-free wireless network, a large number of user equipments (UEs) in a geographical area will be served simultaneously by a large number of distributed access points (APs) based on non-orthogonal multiple access. The distributed APs in a cell-free system coordinate/cooperate with each other through a centralized processing pool [2] for estimating channel state information (CSI) [3], [4], uplink (downlink) decoding (beamforming) [5]-[7], and improving transmission performance [2], [8], [9]. The majority of the works on cell-free systems in the literature tackle the following major technical challenges: i) pilot contamination, ii) high computational and hardware complexity of centralized processing [10]-[12], and iii) traffic/signaling overhead. For instance, in [4], the authors designed a joint uplink/downlink pilot assignment scheme that nulls the cross-pilot contamination terms. Channel reciprocity is still exploited as the downlink pilots are beamformed using the channel estimates obtained from the uplink training. In [13], the authors developed a semi-blind channel estimation of uplink cell-free massive MIMO network utilizing an enhanced K-means clustering algorithm. In [5], the authors proposed a downlink conjugate beamforming and zero-forcing (ZF) precoding scheme for a fully centralized downlink cell-free network. It was shown that the ZF technique outperforms the conjugate beamforming method at the expense of increased computational complexity. However, when the number of UEs and/or APs increases, the complexity of using ZF beamforming increases significantly due to matrix inversion. Accordingly, in [7], a modified conjugate beamforming technique was proposed that uses CSI coordination among the distributed APs. Different machine learning (ML) techniques were used for CSI estimation [3] and beamforming [2] in cell-free networks. For instance, the authors in [3] developed a channel estimation technique for millimeter wave (mmWave)-enabled massive cell-free network using a supervised learning-based denoising convolutional neural network. The authors in [2] formulated and solved a joint problem for AP clustering and uplink beamforming in a massive cell-free network using deep reinforcement learning (DRL) techniques.

To reduce the complexity of centralized data processing in a cell-free network, several works in the literature developed sub-optimal beamforming algorithms based on distributed the authors in [8] proposed a user-centric partitioning method. (The terms 'clustering' and 'partitioning' are used interchangeably.) The proposed method also uses multi-level successive interference cancellation (SIC) at each receiver. Another low-complexity design for cell-free networks was proposed in [2]. The core idea is to reduce the dimensionality of beamforming matrices by dynamic clustering of APs. Each cluster then represents a single multi-antenna AP.

Although cell-free networks represent a very promising solution for many problems caused by network densification [14], a fully centralized cell-free network involves significantly high hardware complexity and heavy processing [2]. Recently, several works in the literature have proposed scalable low-complexity cell-free network designs that are based on either UE-centric clustering or network-centric clustering. In UE-centric clustering, each active UE within the network coverage area selects the best N APs to be simultaneously served by [8], [15]-[17]. On the other hand, in a network-centric clustering scheme, a non-overlapping set of APs may choose a distinct set of UEs to simultaneously transmit/receive data to/from [2], [18]. Although a UE-centric approach allows different UEs to connect to their best serving APs, this mechanism has two major drawbacks for practical design. First, when UEs are given the freedom to pick their best serving APs, they may belong to overlapping clusters, which will make fully centralized detection/processing and coordination a must. Second, the utilization of successive interference cancellation (SIC)-based detection may become very challenging in a UE-centric approach since different UEs will have different decoding order [8]. The aforementioned low-complexity designs, however, sacrifice the performance gain of centralized processing. The complexity of solving the beamforming problem in a centralized manner (e.g. to obtain the beamforming vectors at a centralized processing unit [CPU]) can, however, be reduced by using a distributed learning or processing approach while the detection of the transmitted data is still performed at the CPU. Such a solution has been recently investigated in the literature [19], [20]. Specifically, in [20], the authors utilized supervised learning to solve the beamforming problem in a cell-free network by using a neural network optimizer in each AP.

Along with cell-free network architectures, mmWave transmissions can be used to improve network capacity [21], [22]. Interestingly, cell-free networks were found to provide an efficient solution for the poor scattering and high path-loss problem of mmWave transmissions [21]. Due to the propagation issues related to mmWave channels, massive multiple-input multiple-output (MIMO) systems are usually used for mmWave-supported UEs [23]. A mmWave and MIMO-based cell-free network, however, has very significant amount of computational capabilities at the central unit, especially when the number of UEs within the network increases.

SUMMARY OF THE INVENTION

According to an aspect of the invention there is provided a wireless communication network for a plurality of user devices distributed in a geographical area comprising:
  a plurality of access points having antennas and configured to wirelessly communicate with the user devices, wherein each of the access points further includes a processor and a non-transitory memory operatively connected to the processor and storing instructions to be executed thereon;
  wherein the access points are arranged at spaced locations across the geographical area;

a central server having a processor and a non-transitory memory operatively connected to the processor and storing instructions to be executed thereon, wherein the central server is communicatively connected to the access points and configured to control the wireless communication network;

wherein the access points are grouped, based on channel state information, to form a plurality of communication clusters each in wireless communication with a subset of the user devices in geographically proximal location thereto;

where each communication cluster and the subset of the user devices communicated therewith forms a subnetwork;

wherein the subnetworks are arranged for wireless communication in non-overlapping portions of the geographical area;

wherein the access points of a common subnetwork are configured to wirelessly exchange data with the user devices of the subnetwork using a common frequency range; and wherein each of the communication clusters comprises an edge computing device formed by one or more of the access points belonging thereto and configured to exchange data with the central server.

In one arrangement, main lobes of the antennas of the access points of a common subnetwork are arranged to be directed towards the user devices of the subnetwork.

In one arrangement, side lobes of the antennas of the access points of a common subnetwork are arranged to be directed towards the user devices of different subnetworks.

In one arrangement, directions of lobes of the antennas of the access points of a common subnetwork are determined by the edge computing device of the subnetwork.

In one arrangement, the communication clusters are determined by the central server.

In one arrangement, when at least some of the user devices are mobile, the communication clusters are periodically reformed.

In one arrangement, the communication clusters are configured to use different frequency ranges for communication with the subsets of the user devices.

In one arrangement, the communication clusters are formed by selecting, from all possible configurations of subnetworks including at least one of the access points and at least one of the user devices, a single one of the configurations based on an optimal set of analog beamsteering, digital beamforming and analog combining matrices.

In one arrangement, the optimal set of the analog beamsteering, digital beamforming and analog combining matrices is obtained by solving a combinatorial optimization problem.

In one arrangement, the combinatorial optimization problem is solved using a deep reinforcement learning-cumulative-convex solution.

According to another aspect of the invention there is provided a method of forming a cell-free communication network having a central server and a plurality of distributed access points configured to communicate therewith and to wirelessly communicate with a plurality of distributed user devices, the method comprising:

based on communication channels formable between the access points and the user devices, grouping the access points into a plurality of communication clusters arranged to communicate with subsets of the user devices in geographically proximal location thereto, wherein each pairing of one of the communication clusters and a corresponding one of the subsets of the user devices in communication therewith forms a subnetwork; and selecting one or more of the access points of a common subnetwork as an edge computing device thereof, wherein the edge computing device is in communication with the central server for exchanging data and configuring the cell-free communication network.

In one arrangement, grouping the access points into a plurality of communication clusters comprises selecting, from all possible configurations of subnetworks including at least one of the access points and at least one of the user devices, a single one of the configurations based on an optimal set of analog beamsteering, digital beamforming and analog combining matrices.

In one arrangement, the method further includes solving a combinatorial optimization problem to obtain the optimal set of the analog beamsteering, digital beamforming and analog combining matrices.

In one arrangement, solving a combinatorial optimization problem comprises applying a deep reinforcement learning-cumulative-convex solution to the combinatorial optimization problem.

In one arrangement, grouping the access points into a plurality of communication clusters comprises solving a combinatorial optimization problem to select a prescribed configuration of subnetworks, which includes selecting a prescribed arrangement of antenna beams in each subnetwork, wherein solving a combinatorial optimization problem comprises applying a deep reinforcement learning algorithm thereto.

In one arrangement, applying a deep reinforcement learning algorithm comprises applying a first deep learning agent of the algorithm to solve for the prescribed configuration of subnetworks and outputting an action thereof to an environment of the first deep learning agent in which a second deep learning agent of the algorithm is applied to solve for the prescribed arrangement of antenna beams in each subnetwork of the configuration output by the first deep learning agent.

In one arrangement, applying the second deep learning agent to solve for the prescribed arrangement of antenna beams in each subnetwork comprises applying the second deep learning agent to solve an analog beamsteering problem and outputting an action thereof to an environment of the second deep learning agent in which a convex optimization problem associated with digital beamforming is solved.

In one arrangement, the second deep learning agent is applied over a continuous action space.

In one arrangement, when at least some of the user devices are mobile, grouping the access points into a plurality of communication clusters is periodically repeated.

According to another aspect of the invention there is provided a method of forming beams of antennas of access points in a cell-free communication network comprising:

when the access points are grouped to form a plurality of subnetworks in respective wireless communication with designated subsets of user devices, analog beamsteering, comprising:

directing main ones of the beams of the antennas of the access points of a common subnetwork towards the user devices of the subnetwork to form a coverage area for one or more of said user devices;

directing sides ones of the beams of the antennas of the access points of the common subnetwork towards the user devices of other subnetworks; and after analog beamsteering, digital beamforming, comprising:

computing, for each access point of the common subnetwork, a direction and field strength of each main beam thereof to provide a prescribed transmission rate with each user device of the common subnetwork; and generating each main beam according to the computed direction and field strength.

In one arrangement, analog beamsteering comprises computing a matrix which optimizes communication channels between all of the access points of the common subnetwork and the user devices thereof nullifies communication channels between all of the access points of the common subnetwork and the user devices of other subnetworks.

In one arrangement, analog beamsteering comprises computing a matrix which maximizes a sum of powers of multiple channel projections, a first one of which includes non-annihilating projections of an analog combining vector and an analog beamsteering matrix on a channel state information matrix for the common subnetwork and a second one of which includes an annihilating projection of the analog beamsteering matrix on a channel state information matrix of other subnetworks.

In one arrangement, computing a direction and field strength of each main beam of each access point of the common network comprises ranking signal quality of the user devices of the common network based on non-orthogonal multiple access effective channel gain normalized by a sum of squares of effective channel norms of all of the user devices of other subnetworks.

In one arrangement, analog beamsteering and digital beamforming are periodically repeated.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

Figure 1:
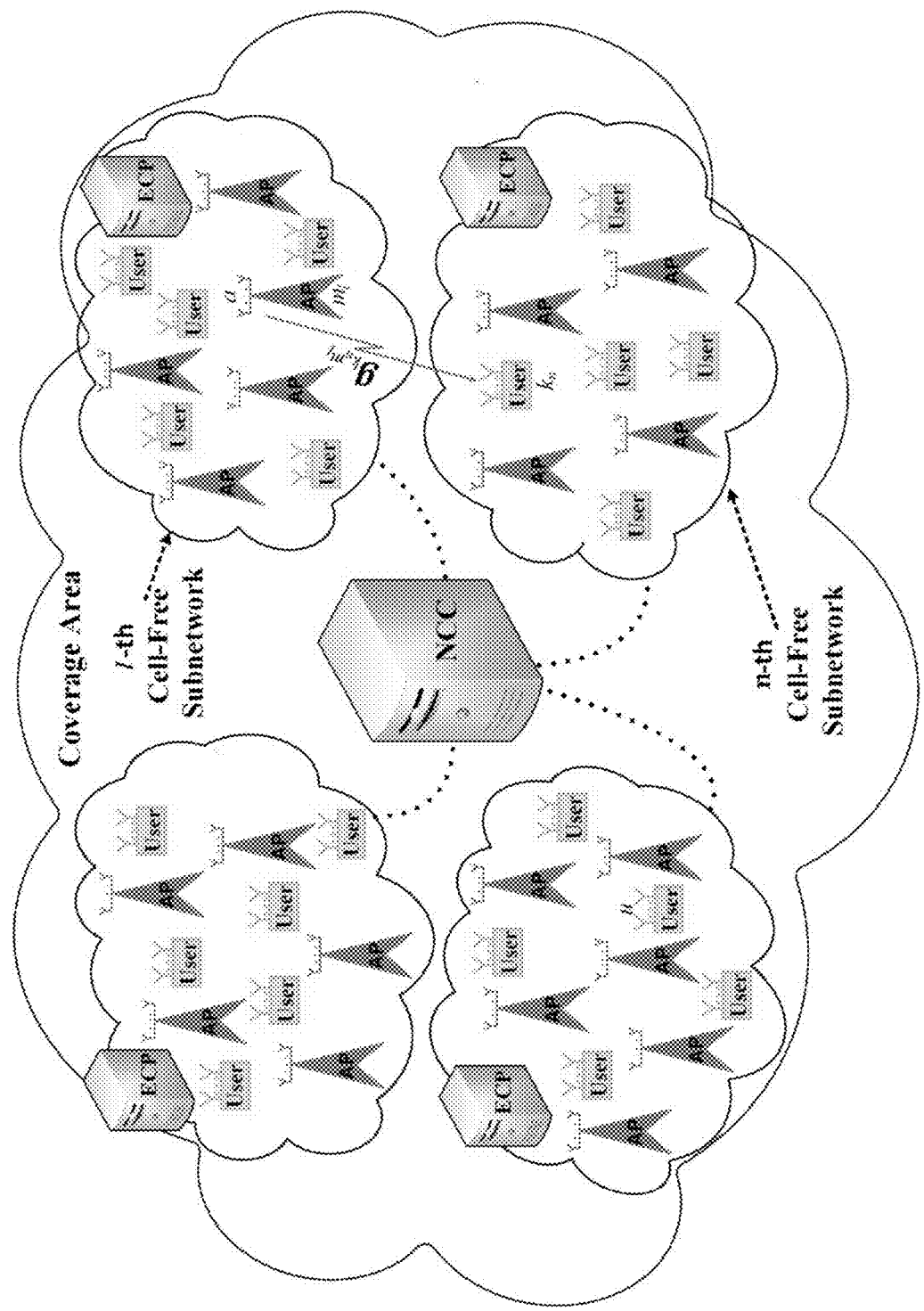
FIG. 1 shows an example scenario for the proposed network architecture (M=19, K=21, and N=4)

With reference to the accompanying figures, there is shown a downlink network with M APs and K UEs (FIG. 1). Each of the APs and UEs is assumed to be equipped with a and u antennas, respectively. To enable multiuser transmission, each AP is assumed to be equipped with L RF chains. All of the APs are connected to each other through fronthaul/backhaul links to form a cell-free network architecture [24]. This enables the distributed APs to collaborate to simultaneously serve all UEs within the network coverage area.

Specifically, the APs collaborate through a network cloud controller (NCC). Each of the APs is assumed to be equipped with a baseband processor that is capable of performing operations related to uplink channel training and downlink beamforming of signals transmitted to different UEs. Such an AP is referred to as an "enhancedAP" (eAP) to distinguish it from conventional APs with passband transmission/reception functionalities. In the proposed network architecture, it is assumed that the all of the eAPs and UEs are partitioned into a set of N, where $1 \leq N \leq M$, non-overlapping clusters (i.e. cell-free subnetworks) on a time-slot basis. All of the UEs of a certain subnetwork are served by all of the eAPs of that subnetwork using the same time-frequency resources. Accordingly, the number of RF chains at each eAP will be equal to the maximum allowable number of UEs per cell-free subnetwork, i.e. $L=K-N+1^2$. (The maximum number of UEs per subnetwork may be defined based on the hardware cost/complexity of the eAPs. This will have a direct impact on the number of RF chains per eAP and the average amount of energy consumption [25].) The group of all baseband processors of eAPs within each cluster can be coordinated to form a virtual edge cloud processor (ECP) unit that is responsible for performing multiuser downlink beamforming within each subnetwork, considering signals from other clusters as Inter-subnetwork interference (ISNI) components. Each eAP may act as an ECP for its subnetwork, or all eAPs of a single subnetwork may form a virtual ECP. Furthermore, the clustering of the cell-free network into a group of non-overlapping cell-free subnetworks is assumed to be performed centrally at the NCC. These two operations of network clustering and subnetwork beamforming are performed either at each time-slot or every several time-slots, based on current CSI and time-varying propagation characteristics of the network. Note that, when N=1, all eAPs and UEs of the network will belong to the same subnetwork which will form a fully centralized cell-free network. On the other hand, when N=M, the overall architecture will act as a conventional wireless cellular network with a reuse factor of 1.

Let us denote by $\mathcal{C} = \{\{\mathcal{C}_1^A, \mathcal{C}_1^U\} \{\mathcal{C}_j^A, \mathcal{C}_j^U\} \ldots \{\mathcal{C}_\mathcal{N}^A, \mathcal{C}_\mathcal{N}^U\}\}$ the set of all possible AP-UE clustering configurations such that every cluster contains at least one AP and one UE. $\mathcal{N}$ is the total number of possible clustering configurations which is a function of M, K, and N, i.e. $\mathcal{N} = \Theta(M,K,N)$ (to be defined in subsequent sections). As an example, with M=4, K=3, and N=2, one possible set is $$C_j = \{\{\underbrace{\{AP_1, AP_3, AP_4\}}_{c_{1,j}^A}, \underbrace{\{UE_2\}}_{c_{1,j}^U}\}, \{\underbrace{\{AP_2\}}_{c_{2,j}^A}, \underbrace{\{UE_1, UE_3\}}_{c_{2,j}^U}\}\}.$$

Let $D_{n,j}^A$ and $D_{n,j}^U$ represent, respectively, the number of eAPs and UEs at the n-th subnetwork of the j-th possible configuration, where $D_{n,j}^A = \text{Cardinality}\{\mathcal{C}_{n,j}^A\}$ and $D_{n,j}^U = \text{Cardinality}\{\mathcal{C}_{n,j}^U\}$, n=1, ..., N and j=1, ..., $\Theta(M, K, N)$. For this model, it is assumed that the $m_n$-th eAP sends a weighted sum of signals of all UEs within the n-th subnetwork. Accordingly, for a given cell-free network clustering configuration, $C_j$, the antennas of the m-th eAP at the n-th cluster (denoted by $m_n$) will have at least $D_{n,j}^U$ streams[3]. For simplicity, it is assumed that at each time instant, the $m_n$-th eAP will use only $D_{n,j}^U \leq L$ RF chains at a time.

The NCC and the ECP will be responsible for the entire communication process. At the beginning of each time slot, the NCC will first estimate the CSI values for the UEs with respect to all serving eAPs. Then the processes of eAP clustering and per-subnetwork downlink beamforming will be performed jointly by the NCC and the virtual ECP.

The communications between the eAPs and the distributed UEs occur in the 24-39 GHz mmWave bands in which transmissions suffer from limited scattering and spatial selectivity. The asymptotic orthogonality assumption among different mmWave channels does not apply to highly correlated mmWave MIMO channels [27]. Accordingly, the well-known three-dimensional clustered model [28] is adopted. A uniform planner array (UPA)[4] at the $m_n$-th eAP and $k_n$-th UE with $\alpha=L_{m,1}L_{m,2}$ and $u=L_{k,1}L_{k,2}$ for which $L_{m,1}(L_{k,1})$ and $L_{m,2}(L_{k,2})$ represent the number of columns and rows of antenna elements, respectively, is considered. The downlink channel gain matrix for the $m_n \to k_n$ link (denoted by $H_{k_n m_n} \in C^{u \times a}$) can be then expressed as [28], [31]

$$H_{k_n m_n} = \sum_{l=1}^{\mathcal{L}} h_{k_n m_n,l} b_U(\vartheta_{k_n m_n,l}, \varphi_{k_n m_n,l}) b_A^*(\theta_{k_n m_n,l}, \phi_{k_n m_n,l}) = \sum_{l=1}^{\mathcal{L}} h_{k_n m_n,l} \mathcal{B}(\theta_{k_n m_n,l}, \phi_{k_n m_n,l}),$$

where L is the number of paths for the $$m_n \to k_n \text{ link}, h_{k_n m_n,l} = \sqrt{\frac{1}{\kappa + \mathcal{L} - 1}} \alpha_{k_n m_n,l} \text{ is the} \quad (1)$$

complex channel gain at the l-th path in the $m_n \to k_n$ link with $\alpha_{k_n m_n,l} \sim CN(0, \sigma_{k_n m_n,l})$, in which $\sigma_{k_n m_n,1} = \kappa$ (the ratio of the line-of-sight [LoS] path power to non-line-of-sight (NLoS) path power), and $\sigma_{k_n m_n,l} = 1, l=2, \ldots, L$. Also, $B(\cdot) = b_U(\cdot) b^*_A(\cdot)$ with $\theta_{k_n m_n} = [\vartheta_{k_n m_n,l}, \theta_{k_n m_n,l}]$ and $\varphi_{k_n m_n} = [\phi_{k_n m_n,l}, \varphi_{k_n m_n,l}]$. In (1), $b_U(\vartheta_{k_n m_n,l}, \phi_{k_n m_n,l}) \in C_{u \times 1}$ and $b_A(\theta_{k_n m_n,l}, \varphi_{k_n m_n,l}) \in C_{\alpha \times 1}$ are the antenna array responses at the $k_n$-th UE and the $m_n$-th eAP, respectively. The antenna array response at the $m_n$-th eAP and $k_n$-th UE, respectively, can be defined as $$b_A(\theta_{k_n m_n,l}, \phi_{k_n m_n,l}) = e^{j2\pi \frac{d(0 \sin \theta_{k_n m_n,l} \cos \phi_{k_n m_n,l} + 0 \sin \phi_{k_n m_n,l})}{\lambda}}, \quad (2)$$

$$\ldots, e^{j2\pi \frac{d(w \sin \theta_{k_n m_n,l} \cos \phi_{k_n m_n,l} + z \sin \phi_{k_n m_n,l})}{\lambda}}, \ldots,$$

$$e^{j2\pi \frac{d((L_{m,1}-1)\sin \theta_{k_n m_n,l} \cos \phi_{k_n m_n,l} + (L_{m,2}-1)\sin \phi_{k_n m_n,l})}{\lambda}}^T,$$

$$b_U(\vartheta_{k_n m_n,l}, \varphi_{k_n m_n,l}) = e^{j2\pi \frac{d(0 \sin \vartheta_{k_n m_n,l} \cos \varphi_{k_n m_n,l} + 0 \sin \varphi_{k_n m_n,l})}{\lambda}}, \quad (3)$$

$$\ldots, e^{j2\pi \frac{d(w \sin \vartheta_{k_n m_n,l} \cos \varphi_{k_n m_n,l} + z \sin \varphi_{k_n m_n,l})}{\lambda}}, \ldots,$$

$$e^{j2\pi \frac{d((L_{k,1}-1)\sin \vartheta_{k_n m_n,l} \cos \varphi_{k_n m_n,l} + (L_{m,2}-1)\sin \varphi_{k_n m_n,l})}{\lambda}}^T,$$

where $\theta_{k_n m_n,l}$ and $\vartheta_{k_n m_n,l}$ are the elevation angles at the $m_n$-th eAP and $k_n$-th UE, respectively, $\varphi_{k_n m_n,l}$ and $\phi_{k_n m_n,l}$ are the azimuth angles at the $m_n$-th eAP and $k_n$-th UE related to the l-th path in the $m_n \to k_n$ link, respectively, d is the antenna spacing of eAPs and UEs, and $\lambda$ is the carrier wavelength. (This assumes that the number of RF chains at each eAP does not fall below $D_{n,j}$[26]. Also, UPA is suitable for mmWave beamforming due to smaller array dimensions, ability to perform 3D beamforming (at the elevation domain), and possibility of packing many antenna elements in a small space [29], [30].)

We assume that downlink transmission is performed based on two types of beamforming schemes, namely, analog RF beamsteering and baseband digital beamforming. Assuming that a certain cell-free network partitioning configuration (say $C_j$) is selected by the NCC, the received combined signal at the $i_n$-th UE can be expressed as $$y_{i_n} = \delta_{i_n}^T \sum_{l=1}^{N} \sum_{m_l=1}^{\mathcal{D}_{l,i}^A} H_{i_n m_l} \sum_{k_l=1}^{\mathcal{D}_{n,j}^U} \mathcal{A}_{m_l} w_{k_l m_l} x_{k_l} + \delta_{i_n}^T \eta_{i_n} = \quad (4)$$

$$\underbrace{\sum_{m_n=1}^{\mathcal{D}_{n,j}^A} \delta_{i_n}^T H_{i_n m_n} \mathcal{A}_{m_n} w_{i_n m_n} x_{i_n}}_{\text{Desired Signal}} + \underbrace{\sum_{m_n=1}^{\mathcal{D}_{n,j}^A} \delta_{i_n}^T H_{i_n m_n} \mathcal{A}_{m_n} w_{k_n m_n} \sum_{k_n=1, k_n \neq i_n}^{\mathcal{D}_{n,j}^U} x_{k_n}}_{\text{IUI}} +$$

$$\underbrace{\sum_{l=1, l \neq n}^{N} \sum_{m_l=1}^{\mathcal{D}_{l,j}^A} \delta_{i_n}^T H_{i_n m_l} \sum_{k_l=1}^{\mathcal{D}_{l,j}^U} \mathcal{A}_{m_l} w_{k_l m_l}}_{\text{ISNI}} + \underbrace{\delta_{i_n}^T \eta_{i_n}}_{\text{AWGN}},$$

where $H_{i_n m l} \in C^{u \times \alpha}$ is the channel gain matrix for the $m_l \to i_n$ link, $A_{ml} \in C^{\alpha \times D_{i,j}^U}$ is the analog RF beamsteering matrix at the $m_l$-th eAP, $w_{k_l m_l} \in R^{D_{i,j} U \times 1}$ is the digital baseband beamforming vector related to the $m_l \to k_l$ link, $\delta mi \in C^{u \times 1}$ is the analog beamsteering/combining vector at the $k_l$-th UE, $x_{kl}$ is the transmitted symbol related to the $k_l$-th UE such that $E[|x_{kl}|2]=P/D_{i,j}^U$ where P is the transmission power budget at each eAP, and $n_{in}$ is the additive white Gaussian noise (AWGN) vector at the input of the $i_n$-th UE where $n_{in} \sim N(0, \phi_{i_n} I), \forall i_n=1,2,\ldots,D_n^U, j=1,\ldots,N$. The instantaneous signal-to-interference-plus-noise ratio (SINR) at the input of the $i_n$-th UE under clustering configuration $C_j$ can be expressed as $$\gamma_{i_n}^{|C|} = \frac{\sum_{m_n=1}^{\mathcal{D}_{n,j}^A} |\delta_{i_n}^T H_{i_n m_n} \mathcal{A}_{m_n} w_{i_n m_n}|^2}{\left(\begin{array}{c}\sum_{m_n=1}^{\mathcal{D}_{n,j}^A} \sum_{k_n=1, k_n \neq i_n}^{\mathcal{D}_{n,j}^U} |\delta_{i_n}^T H_{i_n m_n} \mathcal{A}_{m_n} w_{k_n m_n}|^2 + \\ \tilde{\sigma}_{i_n} \sum_{j=0}^{u} \delta_{i_n,j}^2 + \\ \sum_{l=1, l \neq n}^{N} \left(\frac{\mathcal{D}_{n,j}^U}{\mathcal{D}_{i,j}^U}\right) \sum_{m_l=1}^{\mathcal{D}_{l,j}^A} \sum_{k_l=1}^{\mathcal{D}_{l,j}^U} |\delta_{i_n}^T H_{i_n m_l} \mathcal{A}_{m_l} w_{k_l m_l}|^2\end{array}\right)}, \quad (5)$$

where $$\tilde{\sigma}_{i_n} = \left(\frac{\sigma_{i_n} \mathcal{D}_{n,j}^U}{2P}\right)^2.$$

Note that equation (5) is derived based on the assumption that both transmitter and receiver have a full knowledge of CSI of the corresponding link.

To achieve the best performance with the proposed cell-free architecture, the operations of network partitioning, analog beamsteering, and digital beamforming must be jointly optimized (e.g. by solving an optimization problem globally). The objective of this problem can be, for example, maximization of the sum-rate of all users (i.e. max-sum objective), or maximization of the minimum rate of the users (i.e. max-min objective to achieve fairness). The general problem formulation can be stated as follows:

$$P_1: \max_{j, \{A_{m_n}, \Delta_{m_n}, W_{m_n}\}_{m_n=1,\ldots,N}^{n=1,\ldots,N}, D_{n,j}^A} f\left(\left\{\gamma_{i_n}^{\{C_j\}}\right\}_{i_n=1,\ldots,D_{n,j}^U}^{n=1,\ldots,N}\right)$$

subject to:

$$C_1: |A_{m_n}(q, z)|^2 = 1, \forall q = 1, \ldots, a, \text{ and } z = 1, \ldots, D_{n,j}^U, \quad (6)$$

$$C_2: |\delta_{k_n}(q)|^2 = 1, \forall k_n = 1, \ldots, D_{n,j}^U, \text{ and } q = 1, \ldots, u,$$

$$C_3: \|W_{m_n}([1\ldots D_{n,j}^U], z)\|^2 \le 1, \forall z = 1, \ldots, D_{n,j}^U,$$

where $A_{m_n} \in \mathbb{C}^{\alpha \times D_{i,j}^U}$ the analog beamsteering matrix at the $m_n$-th eAP, $W_{m_n} \in \mathbb{R}^{D_{n,j}^U \times D_{n,j}^U}$ is the digital beamforming matrix at the $m_n$-th eAP with $W_{m_n}[w_{1,m_n}, \ldots, w_{D_{n,j}^U}]$, where $w_{k_n m_n}[\sqrt{w_{k_n m_n, 1}}, \ldots, \sqrt{w_{k_n m_n, D_{n,j}^U}}]$ is the digital baseband beamforming vector related to the $m_n \to k_l$ link, $\Delta_{m_n} \in \mathbb{R}^{u \times D_{n,j}^U}$ is the analog beamsteering/Combining matrix related to all UEs of the $m_n$-th subnetwork, in which $\Delta_{m_n} = \delta_{1_n}, \ldots, \delta_{D_{n,j}^U}$, where $\delta_{k_n} = [(\delta_{k_n,1}, \ldots, (\delta_{k_n,u}]$ is the analog beamsteering/combining vector at the $k_n$-th UE. Furthermore, the index $j \in [1, \ldots, \Theta(M,K,N)]$ refers to the selected cell-free partitioning configuration.

$P_1$ is a combinatorial optimization problem which is characterized by: i) non-convexity of the objective function $f(\cdot)$ (discrete j), ii) discrete nature of optimization variable j, iii) non-affine nature of the constraints $C_1$ and $C_2$. To solve $P_1$ optimally, a simultaneous optimization for j, $A_{m_n}, \Delta_{m_n}$, and $W_{m_n}$, $\forall n=1, \ldots, N$, $m_n=1, \ldots, D_{n,j}^A$, and $k_n=1, \ldots, D_{n,j}^U$ is performed. This is achieved by going through every possible clustering configuration of the cell-free network ($C_j, j=1, \ldots, \Theta(M,K,N)$), and for each $C_j$, the corresponding optimal analog beamsteering and digital beamforming matrices (i.e. $A_{m_n}, \Delta_{m_n}$, and $W_{m_n}$) is sought. The globally optimal solution is then the one that gives the best performance among all possible clustering configurations and the corresponding matrices $A_{m_n}, \Delta_{m_n}$, and $W_{m_n}$. The solution will have a combinatorial computational complexity in terms of the network parameters such as M,KN,$\alpha_{m_n}$, and $u_{k_n}$.

As previously mentioned, the problem $P_1$ in (6) is a combinatorial optimization problem with four overlapping feasible spaces (spaces of j, $A_{m_n}, \Delta_{m_n}$, and $W_{m_n}$). Such a problem can be solved by global optimization techniques such as deterministic methods (e.g. inner and outer approximation and cutting-plane methods), stochastic methods (e.g. direct Monte-Carlo sampling and stochastic tunneling), and heuristic methods (e.g. genetic algorithms and swarm-based optimization algorithms) [32]. However, generating an efficient solution of $P_1$ with reasonable computational complexity and short computing time becomes very challenging as the number of eAPs and/or UEs increases. There is disclosed herein an efficient low-complexity mixed DRL-cum-convex optimization-based solution of $P_1$. In the following, the problem of downlink beamforming at each cell-free subnetwork is discussed and a hierarchical DRL-based scheme that jointly performs network clustering and per-subnetwork hybrid beamforming is disclosed.

Figure 2A:
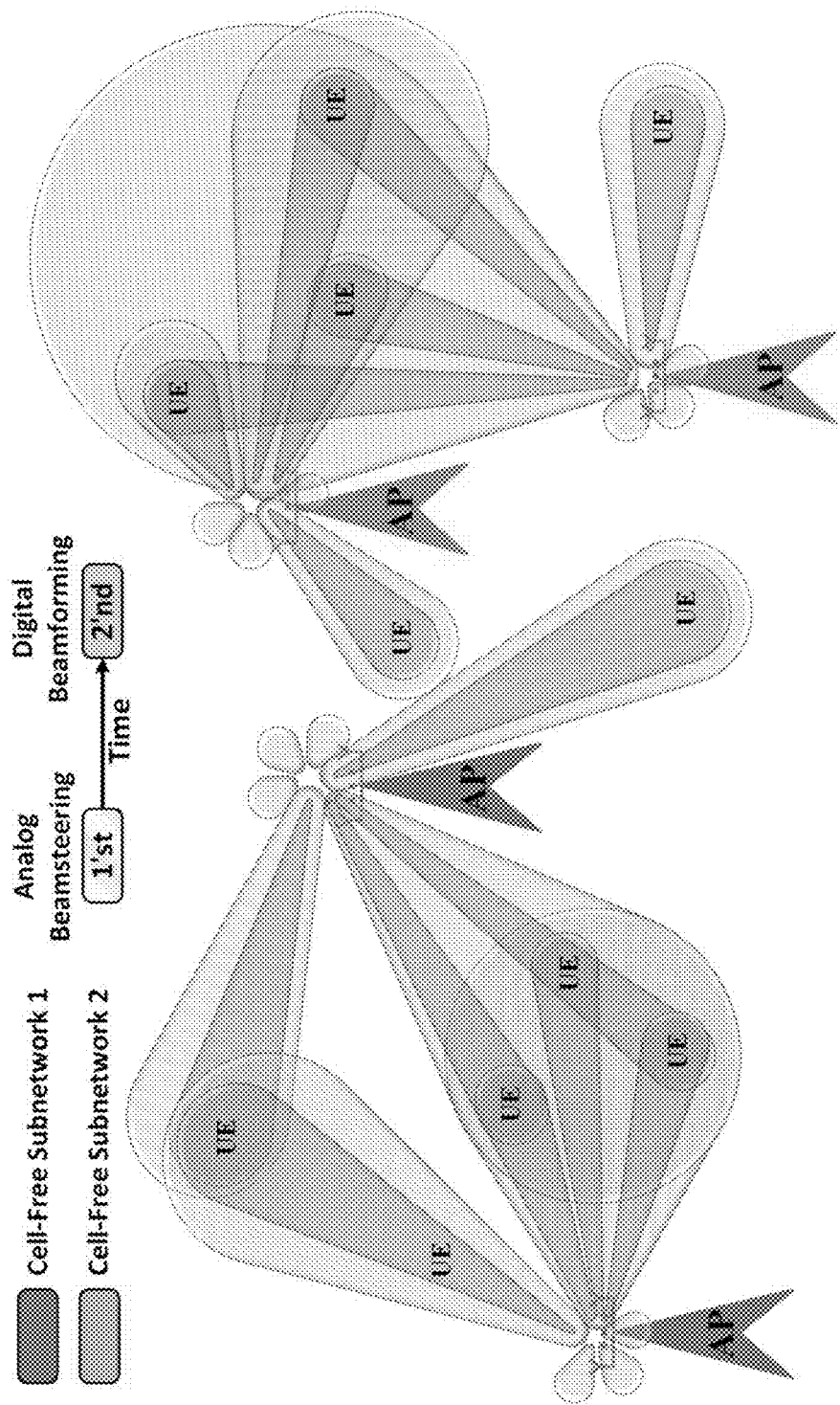
FIG. 2A shows an example scenario of hybrid beamforming.

Partitioning the overall cell-free network architecture (i.e. eAPs and UEs) into a set of computationally independent cell-free subnetworks introduces ISNI to the received signal. Furthermore, simultaneous inband transmission will cause IUI to all UEs that belong to the same subnetwork. A novel hybrid analog-digital beamforming scheme efficiently mitigates the effects of ISNI and IUI. Specifically, in the proposed method, downlink beamforming at the multi-antenna eAPs within each cluster is performed in two consecutive stages (FIG. 2A). Under a certain network partitioning configuration (e.g. $C_j$ for some j), each cell-free subnetwork first performs an analog beamsteering for all eAPs such that the ISNI from the nearby clusters is minimized. This is achieved by directing the main beams of eAPs (i.e. the main lobes of antennas at each eAP) to the UEs belonging to the same cluster and setting the beam directions of annihilated side lobes to the UEs located outside the intended subnetwork (ISNI minimization). Once the beams of different subnetworks are steered to their desired coverage areas, digital beamforming (FIG. 2B) is performed at each eAP to maximize the overall performance and mitigate IUI for the UEs that are located within the intended cell-free subnetwork. Digital beamforming is performed using the overall effective channel after applying the analog beamsteering phase matrices to the original CSI matrices.

Figure 2B:
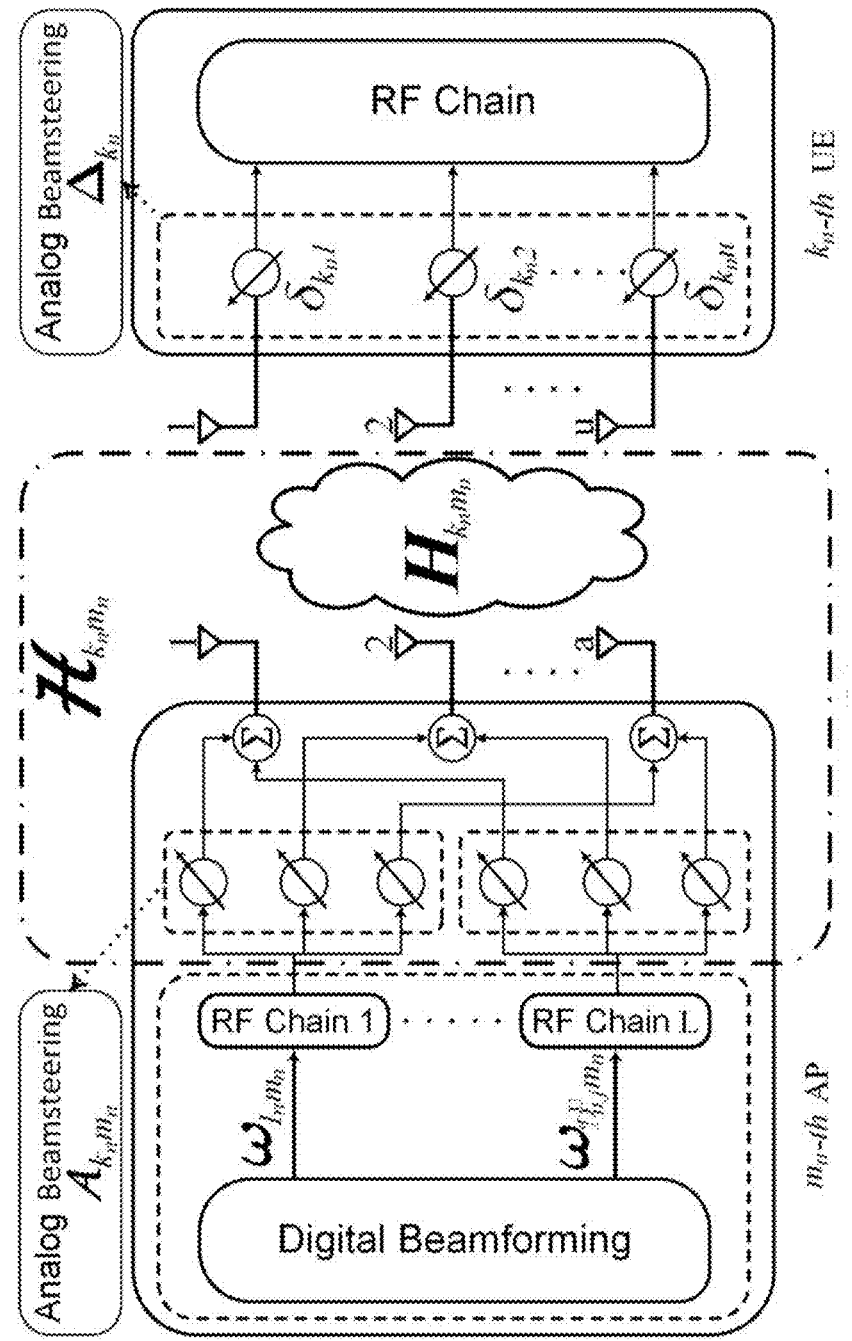
FIG. 2B shows a block diagram of hybrid beamforming.

For the proposed beamforming scheme, each eAP is assumed to be equipped with L RF chains. Each UE within each subnetwork is assigned to one communication stream by each eAP in that subnetwork. (A single-baseband communication stream is handled by a single RF-chain.) To achieve this, the number of UEs at each cell-free subnetwork must not exceed the number of RF chains at each eAP (i.e. $D_{n,j}^U \le L$). FIG. 2B illustrates the functional block diagram of the $m_n$-th eAP transmitter/beamformer and the $k_n$-th UE. At the UE side, it is assumed that signal from different antennas are combined through a low-complexity analog beamsteering/combining scheme using the analog combining vector $\delta_{k_n}$. After analog beamsteering at all eAPs and UEs, digital beamforming takes place considering the effective CSI obtained after applying analog beamsteering at both eAPs and UEs (i.e. after applying $A_{m_n}$ and $\delta_{k_n}$, $\forall n,m,k$). From the perspective of a cell-free sub-network, the introduced analog beamforming scheme does not affect the implemented fully-digital beamforming scheme, rather it is an additional pre-processing operation to cancel ISNI. Accordingly, the hybrid two-stage beamforming scheme is expected to outperform its single stage digital beamforming counterpart.

The main beam (also referred to as the main lobe) of an antenna element contains the largest portion of the field strength (either radiated or absorbed). The direction of the main beam of a single antenna can be adjusted to match the direction of arrival of the transmitted signal (elevation and azimuth angles) [33]. There is therefore disclosed an analog beamsteering technique to be used in the first-stage of downlink signal transmission at each cell-free subnetwork. This is achieved by utilizing the spatial signatures between UEs of the overall cell-free network and those of eAPs of the intended subnetwork. Specifically, analog beamsteering in a cell-free subnetwork is used to minimize the ISNI caused to the UEs from outside the intended subnetwork. This is achieved by directing the main lobes of the eAPs of each subnetwork toward the UEs belonging to the same subnetwork and setting the directions of the weakest beam side lobes to those outside the intended subnetwork.

Designing the beamsteering objective function: In order to mitigate the ISNI components, analog beamsteering matrices $A_{m_n}, \forall m_n=1, \ldots, D_{n,j}^U$ and $n=1, \ldots, N$ at the $m_n$-th eAP have to be designed such that they "zero-force" the communication links between all eAPs of the n-th subnetwork with UEs outside the intended subnetwork. At the same time, the communication links between all eAPs of the n-th subnetwork and UEs inside the intended subnetwork are optimized. To achieve this, let us first define the "null space" of an arbitrary $m_x \to k_y$ MIMO link using the following axiom.

Axiom 1. Let $H_{k_y m_x} \in \mathbb{C}^{u \times \alpha}$ be an arbitrary mmwave MIMO channel matrix. If the singular value decomposition (SVD) of $H_{k_y m_x}$ is given by $$H_{k_y m_x} = U_{k_y m_x} \Sigma_{k_y m_x} V^*_{k_y m_x} = [U_{k_y m_x}^{(1)} U_{k_y m_x}^{(0)}] \Sigma_{k_y m_x} [V_{k_y m_x}^{(1)}, V_{k_y m_x}^{(0)}]^*, \quad (7)$$

then the left null space of $H_{k_y m_x}$ is given by $$\text{Null}_L(H_{k_y m_x}) = U_{k_y m_x}^{(0)} \quad (8)$$

Furthermore, the right null space of $H_{k_y m_x}$ is given by where $U_{k_y m_x} \in \mathbb{C}^{u \times u}$ and $V_{k_y m_x} \in \mathbb{C}^{\alpha \times \alpha}$ are unitary matrices, and $\Sigma_{k_y m_x} \in \mathbb{R}^{u \times \alpha}$ is a diagonal matrix containing the eigenvalues of $H_{k_y m_x}$. $U_{k_y m_x}^{(1)} \in \mathbb{C}^{u \times r}$ and $V_{k_y m_x}^{(1)} \in \mathbb{C}^{\alpha \times r}$ are the matrices with columns from $U_{k_y m_x}$ and $V_{k_y m_x}$, respectively, corresponding to the non-zero eigenvalues of $H_{k_y m_x}$ and $U_{k_y m_x}^{(0)} \in \mathbb{C}^{u \times (u-r)}$, $V_{k_y m_x}^{(0)} \in \mathbb{C}^{\alpha \times (\alpha-r)}$ with columns from $U_{k_y m_x}$ and $V_{k_y m_x}$, respectively, corresponding to the zero eigenvalues of $H_{k_y m_x}$, where $r = \text{rank}(H_{k_y m_x})$.

To guarantee the existence of a null space for any arbitrary $H_{k_y m_x}$, the number of antennas at each eAP must exceed that of UEs served by that eAP. This condition complies with the fact that mmWave networks use massive MIMO systems at all distributed eAPs. Given the left and right nullspaces of $H_{k_y m_x}$, the projection of a complex vector $\delta_{k_y}$ into $U_{k_y m_x}^{(0)}$ can be given by $$\delta^\perp_{k_y m_x} = \delta^T_{k_y} U_{k_y m_x}^{(0)} \left( U_{k_y m_x}^{(0)} \right)^*. \quad (10)$$

Furthermore, the projection of a matrix $A_{m_x}$ into $V_{k_y m_x}^{(0)}$ can be given by $$\mathcal{A}^\perp_{k_y m_x} = V_{k_y m_x}^{(0)} \left( V_{k_y m_x}^{(0)} \right)^* \mathcal{A}_{m_x}. \quad (11)$$

(10) and (11) above can be derived using the fact that $$\left( \delta_{k_y} - \delta^\perp_{k_y m_x} \right)^T U_{k_y m_x}^{(0)} = 0,$$

$$\left( V_{k_y m_x}^{(0)} \right)^* \left( \mathcal{A}_{m_x} - \mathcal{A}^\perp_{k_y m_x} \right) = 0$$

and $U_{k_y m_x}^{(0)}(U_{k_y m_x}^{(0)})^* = I_u$, $V_{k_y m_x}^{(0)}(V_{k_y m_x}^{(0)})^* = I_\alpha$, where $I_u \in \mathbb{R}^{\alpha \times \alpha}$ are identity matrices. Using a similar procedure, the projection of $\delta_{k_y}$ and $\mathcal{A}_{m_x}$ on the left and right non-annihilating subspaces of $H_{k_y m_x}$ can be given, respectively, by $$\delta^V_{k_y m_x} = \delta^T_{k_y} U_{k_y m_x}^{(1)} \left( U_{k_y m_x}^{(1)} \right)^*, \text{ and}$$

$$\mathcal{A}^V_{k_y m_x} = V_{k_y m_x}^{(1)} \left( V_{k_y m_x}^{(1)} \right)^* \mathcal{A}_{m_x}.$$

The objective of analog beamsteering is to reduce ISNI within each cell-free subnetwork. However, focusing only on ZF technique to remove the interfering beams (i.e. ISNI) between adjacent subnetworks may result in misalignment of the main beams of the eAP antennas with those of the UEs within the same subnetwork, and hence reduced/inappropriate antenna directivity. The reason is, while steering the main antenna beams away from the UEs of adjacent subnetworks, at the same time, the main beams are steered to the direction of the UEs of the same subnetwork. Accordingly, the CSI of all the UEs (inside and outside the intended subnetwork) must be taken into account while performing beamsteering. Therefore, a novel analog beamsteering scheme based on maximizing the so-called "secrecy sum power gains" at each subnetwork is proposed. This is done at the n-th subnetwork by maximizing the sum of powers of two channel projections: i) the non-annihilating projections of $\delta_{k_n}$ and $$\mathcal{A}_{m_n} \text{ on } H_{k_n m_n}$$

(i.e. $\delta^V_{k_n m_n}$ and $\mathcal{A}^V_{k_n m_n}$, $\forall k_n = 1, \ldots, \mathcal{D}^U_{n,j}$ & $m_n = 1, \ldots, \mathcal{D}^A_{n,j}$), and ii) the annihilating projections of $$\mathcal{A}_{m_n} \text{ on } H_{k_l m_n} \left( \text{i.e. } \mathcal{A}^\perp_{k_l m_n}, \forall l \neq n \right).$$

The beamsteering optimization problem $P_2$ to mitigate ISNI may now be formulated, which will be solved for the n-th cell-free subnetwork, as follows:

$$P_2: \max_{\substack{\{\delta_{k_n}, A_{m_n}\}_{k_n=1,\ldots,\mathcal{D}^U_{n,j}}^{m_n=1,\ldots,\mathcal{D}^A_{n,j}}}} \sum_{m_n=1}^{\mathcal{D}^A_{n,j}} \left( \sum_{k_n=1}^{\mathcal{D}^U_{n,j}} \left\| \delta^V_{k_n m_n} \sum_{k_n m_n} A^V_{k_n m_n} \right\|^2 + \sum_{l=1, l \neq n}^{N} \sum_{k_l=1}^{\mathcal{D}^U_{l,j}} \left\| \delta^\perp_{k_l m_n}(t-1) \sum_{k_l m_n}, A^\perp_{k_l m_n} \right\|^2 \right), \quad (14)$$

subject to:

$$\delta^V_{k_n m_n}$$

In the objective function of $P_2$ in (14), the variable matrices $$\mathcal{A}^V_{k_n m_n}, \mathcal{A}^\perp_{k_n m_n}$$

and $$C_1: |A_{m_n}(q, z)|^2 = 1, \forall q = 1, \ldots, a \text{ and } z = 1, \ldots, u,$$

$$C_2: |\delta_{k_n}(q)|^2 = 1, \forall q = 1, \ldots, u.$$

are non-linear functions of $S_{k_y}$ and $\mathcal{A}_{m_n}$. This relationship can be inferred from (12) and (13) as a non-linear truncation of unitary matrices of the SVD of $S_{k_y}$ and $\mathcal{A}_{m_n}$. Accordingly, $P_2$ is a non-convex combinatorial optimization problem.

After the analog beamsteering at all MIMO transmitters (eAPs) and receivers (UEs) has been performed, the actual CSI matrices (i.e. $H_{k_n m_n}$, $\forall n, m_n,$ and $k_n$) will be multiplied by the beamsteering matrices (from the right side) and the analog combining/beamsteering vectors (from the left side). Accordingly, the effective channel gain at the $m_n \to k_n$ link (denoted by $H_{k_y m_x} \in \mathbb{C}^{1 \times D_{n,j}^U}$) will be given by $$\mathcal{H}_{k_n m_n} = S_{k_n}^T H_{k_n m_n} \mathcal{A}_{m_n}. \tag{15}$$

Note that, the $i_n$-th element in $\mathcal{H}_{k_n m_n} (i_n = 1_n, \ldots, D_{n,j}^U)$ corresponds to the signal radiated from the beam steered at UE $i_n$ within the $m_n$-th subnetwork. However, each element in $\mathcal{H}_{k_n m_n}$ will contain portions of signals sent to all UEs of the n-th subnetwork.

UE ordering and SIC decoding: In downlink multiuser single-input single-output (SISO) wireless networks, SIC-based UEs (usually referred to as non-orthogonal multiple access [NOMA] UEs) are first ordered based on their instantaneous channel gains. Then, the UEs with lower link gains are allocated higher transmission power compared to those with better communication link. At the receiver side, multilevel SIC operations are conducted such that the interfering signals related to the UEs with lower channel gains are decoded and then subtracted [34]. When the UEs of a downlink NOMA system are served by a single eAP with multiple antennas or by multiple single-antenna APs, the UEs can be ordered based on the norm of their channel quality vector [8]. Such a channel quality metric is denoted as the "effective channel gain". In our considered network model, however, all the eAPs and the UEs in each cluster are assumed to be equipped with multiple antennas. Therefore, the channel gain between each eAP and any arbitrary NOMA UE is represented by a complex matrix. The squared norm of the effective channel gain vectors (i.e. $H_{k_n m_n}$), normalized by the sum of the squares of the effective channel norms of all UEs falls outside the intended cell-free subnetwork as the NOMA effective channel gain. Such a normalization process guarantees that the ordering of signal quality of each UE is correct and is not changed by severe ISNI. Accordingly, it is assumed that the UEs within the n-th cluster are arranged in an ascending order as follows:

$$\frac{\sum_{m_n=1}^{\mathcal{D}_{n,j}^A} |\mathcal{H}_{1_n m_n}|^2}{\sum_{l=1, l \neq n}^N \sum_{m_l=1}^{\mathcal{D}_l^A} \sum_{k_l=1}^{\mathcal{D}_l^U} |\mathcal{H}_{k_l m_l}|^2} \leq$$

$$\ldots \leq \frac{\sum_{m_n=1}^{\mathcal{D}_{n,j}^A} |\mathcal{H}_{i_n m_n}|^2}{\sum_{l=1, l \neq n}^N \sum_{m_l=1}^{\mathcal{D}_l^A} \sum_{k_l=1}^{\mathcal{D}_l^U} |\mathcal{H}_{k_l m_l}|^2} \leq$$

$$\ldots \leq \frac{\sum_{m_n=1}^{\mathcal{D}_{n,j}^A} |\mathcal{H}_{D_{n,j}^U m_n}|^2}{\sum_{l=1, l \neq n}^N \sum_{m_l=1}^{\mathcal{D}_l^A} \sum_{k_l=1}^{\mathcal{D}_l^U} |\mathcal{H}_{k_l m_l}|^2}$$

Note that, for the UE ordering, we divide the effective channel metric of each UE by the corresponding ISNI assuming the availability of channel gain matrices of the overall cell-free network at each eAP. With proper power allocation for the UEs, at the receiver side, the $i_n$-th UE located in the n-th cluster will be able to remove interference components from $i_n - 1$ UEs with higher overall power gain. Accordingly, $\gamma_{i_n}^{(e_j)}$ can be rewritten as $$\gamma_{i_n}^{\{C_j\}} = \frac{\sum_{m_n=1}^{\mathcal{D}_{n,j}^A} |\mathcal{H}_{i_n m_n} w_{i_n m_n}|^2}{\sum_{m_n=1}^{\mathcal{D}_{n,j}^A} \sum_{k_n=i_n+1}^{\mathcal{D}_{n,j}^U} |\mathcal{H}_{i_n m_n w_{k_n m_n}}|^2 + \tilde{\sigma}_{i_n} \sum_{j=1}^u \delta_{i_n j}^2 +} \tag{16}$$

$$\sum_{l=1, l \neq n}^N \left(\frac{\mathcal{D}_{n,j}^U}{\mathcal{D}_{l,j}^U}\right)^2 \sum_{m_l=1}^{\mathcal{D}_{l,j}^A} \sum_{k_l=1}^{\mathcal{D}_{l,j}^U} |\mathcal{H}_{i_n m_l} w_{k_l m_l}|^2$$

where $\tilde{\sigma}_{i_n} = \left(\frac{\sigma_{i_n} \mathcal{D}_{n,j}^U}{2P}\right)^2$.

A beamforming (i.e. precoding) scheme that maximizes the sum-rate of the UEs is disclosed. The digital beamforming problem at the n-th cell-free subnetwork under a certain cell-free network partitioning configuration ($C_j$) can be formulated as $$P_3 : \max \sum_{n=1}^N \sum_{m=1}^{\mathcal{D}_{n,j}^U} \log_2 \left(1 + \gamma_{i_n}^{\{C_j\}}\right)$$

$$\{w_{k_n m_n}\}_{k_n=1, \ldots, \mathcal{D}_{n,j}^U}^{m_n=1, \ldots, \mathcal{D}_{n,j}^A}$$

subject to:

$$C_1 : \sum_{m_n=1}^{\mathcal{D}_{n,j}^A} \left( \|\mathcal{H}_{i_n m_n} w_{\delta_{i_n} m_n}\|^2 - \sum_{w=\delta_{i_n}+1}^{i_n} \|\mathcal{H}_{i_n m_n} w_{w m_n}\|^2 \right) \geq \epsilon, \tag{18}$$

$$C_2 : \|w_{k_n m_n}\|^2 \leq 1,$$

$$\forall \delta_{i_n} = 1, \ldots, i_n - 1, l = 2, \ldots, \mathcal{D}_{n,j}^U, m_n = 1, \ldots, \mathcal{D}_{n,j}^A,$$

$$k_n = 1, \ldots, \mathcal{D}_{n,j}^U, \text{ and } n = 1, \ldots, N,$$

where, the set of constraints $C_1$ represents the necessary conditions for successful SIC operations at the receiver side, in which $\epsilon$ is the receiver sensitivity. This means, the difference of received power between the combined signals of two successive users must not fall below $\epsilon$. In [8, Appendix C], it was shown that problem $P_3$ in (17) represents a convex optimization problem under the assumption of UE ordering and SIC-based decoding. Specifically, it was shown that the objective function of $P_3$ in (17) can be decomposed into a sum of convex and concave functions with the convex function having a more increasing rate than that of the concave one. Furthermore, it is easy to confirm that the constraints $C_1$ and $C_2$ represent affine relations of $w_{k_n m_n}$. (This can be easily confirmed by rewriting the vector form of $C_1$ and $C_2$ in a sum of products format, rather than vector format.) This convex problem can be easily solved by using the Karush-Kuhn-Tucker (KKT) conditions and utilizing some numerical methods for calculating the first and second differentiation of the Lagrangian function. (Despite the existence of the second derivative of the objective function, a closed-form expression is difficult to derive due to the multidimensional nature of the optimization variables.)

DRL techniques have been used to solve optimization problems in wireless communications systems (e.g. for optimization of downlink power control in a multi-cell system [35], beamforming optimization in a cell-free network [2]). In these cases, a DRL agent (e.g. a network entity)

aims at learning the "optimal" mapping between a system state s and the action a (e.g. a policy function or a value function) in order to maximize its reward discounted reward over a time horizon. Depending on the agent's objective, DRL techniques are commonly classified into three categories:

- Value-based methods such as deep Q-learning (DQL) and state-action-reward-state-action (SARSA) learn the value function V (s) or the state-value function Q(s,a) to find a policy.
- Policy-based methods obtain the mapping between the system state and the action (i.e. policy) directly. These methods generally suffer from noisy gradients and high variance [36].
- Actor-critic methods are a hybrid of the value-based and policy-based methods. Value-based methods are used to reduce the variance of the policy-based methods by estimating the value function or the action-value function (a.k.a. the critic) to improve the performance of the policy (a.k.a. the actor).

Figure 3:
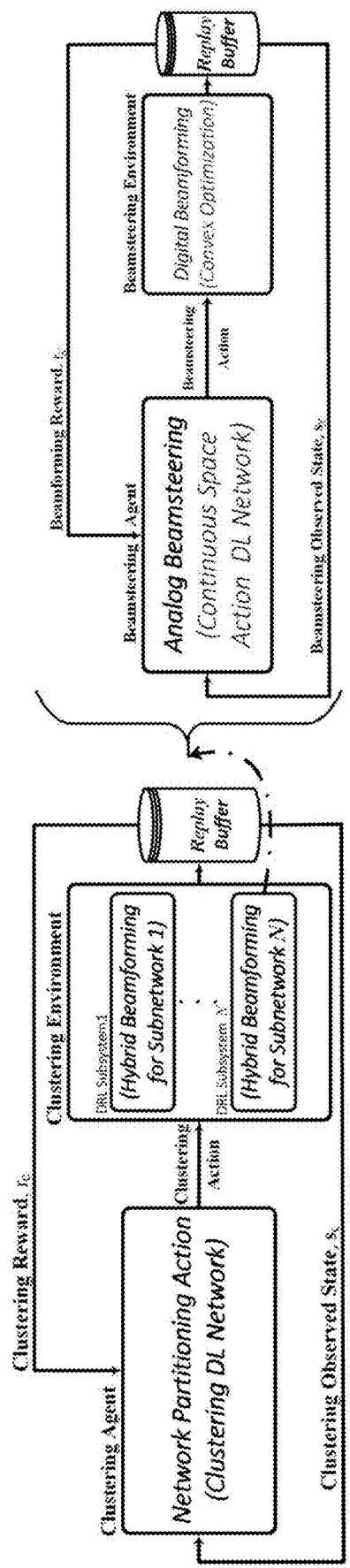
FIG. 3 shows a block diagram of a hierarchical deep reinforcement learning (DRL) clustering system.

The proposed solution consists of two-levels of interacting DRL models. The first level of the proposed system is responsible for network partitioning (i.e. clustering) and it consists of a single DRL model. The agent of the first-level DRL model is located at the NCC and is mainly responsible for partitioning the overall cell-free network into a set of non-overlapping cell-free subnetworks. Since the action of this system has a direct impact on the size/content of each cell-free subnetwork, it is assumed that this DRL system operates centrally (i.e. the reward of this DRL system represents a function of rewards from all cell-free subnetworks). A group of distributed N DRL subsystems operate independently of each other in a distributed manner to perform hybrid beamforming. The second level of the proposed hierarchical architecture consists of N independent DRL subsystems. Each DRL subsystem is responsible for conducting the hybrid analog beamsteering-digital beamforming process in a single cell-free subnetwork. This is achieved by training the DRL subsystem agent to optimize the analog beamsteering vectors of all eAPs and UEs of the corresponding cell-free subnetwork while the digital beamforming problem for the same subnetwork is modeled and solved as a convex optimization problem inside the environment of the DRL subsystem for analog beamsteering. Accordingly, the heavy processing of the centralized analog beamforming and/or digital beamsteering is split among different cell-free subnetworks. All of the DRL subsystems are within the environment of the first-level DRL clustering system (FIG. 3A). In terms of the time-scale of operation, the overall cell-free network is assumed to cluster (partition) every $\tau \geq 1$ time instants. (The value of $\tau$ may be considered as a design parameter that can depend, for example, on the time-varying nature of the propagation environment.) On the other hand, the hybrid beamforming process is assumed to take place at each time slot. Further details about the DRL model action spaces, rewards, and observed states are described hereinafter.

One aspect herein is to design a self-organizing cell-free network that has the ability to self-partition (self-cluster) into a group of cell-free subnetworks, in a time-slot basis, based on the instantaneous CSI. For the proposed dynamic cell-free network with M eAPs, K UEs, and N subnetworks, there will be $$\Theta(M, N) = \left(\frac{N!}{\sqrt{2}}\right)^2 C(M, N)C(K, N)$$

possible configurations for cell-free subnetworks, where C (M,N) is the Stirling number, which can be calculated as [37]

$$C(M, N) = \left\{ \begin{array}{c} M \\ N \end{array} \right\} = \frac{1}{N!} \sum_{i=0}^{N} (-1)^i \binom{N}{i} (N-i)^M. \quad (18)$$

Optimally updating the cell-free network configuration on a time-slot basis comprises going through all possible configurations which will be practically infeasible for a massive cell-free network with large numbers of eAPs and UEs. (As an example, for M=100, K=50, and N=10, there will be approximately $1.28962122 \times 10^{138}$ possible cell-free subnetwork configurations.)

There are disclosed several low-complexity DRL-based methods to efficiently perform network clustering on a time-slot basis. Each of these methods accepts certain network information (e.g. instantaneous CSI values across the entire network) and outputs a certain network partitioning configuration that maximizes a predefined network performance metric. Table II summarizes the environment design for the DRL models in terms of the problem parameters. Note that, in Table II, the DRL system state vector ($s_c$) corresponds to a clustering configuration with N clusters (i.e. an N-element vector) and the value of each element is the product of the SINR values of all the UEs in the corresponding cluster (or partition). The immediate reward value for a state is given by the product of the sum of the rates of the users in each cluster, under the corresponding clustering configuration. Among the different DRL methods, the following are investigated: (i) value-based DRL methods, namely, the deep double Q-network DDQN [38] and State-action-reward-state-action (SARSA) [39], (ii) a policy-based DRL method, namely, the policy gradient (PG) [40] method, and (iii) the actor-critic (AC) [41] method. The performance, complexity, and convergence rate of these methods are then evaluated and compared.

Value-based DRL methods (e.g. DDQN and SARSA): In value-based clustering, each network partitioning configuration is assigned a certain value through a state-value function $V^{529}$ ($\Gamma_N$), also known as the expected return function when starting at a certain state $\Gamma_M$, where $\Gamma_N = (\gamma_1^P, \ldots, \gamma_N^P)$ and $$\gamma_n^P = \prod_{t=1}^{\tau} \prod_{i_n=1}^{D_{n,j}^{\cup}\{C_j\}} \gamma_{i_n}^{\{C_j\}}(t).$$

The state-value function is defined as $V^\pi(\Gamma_N) = E[r|\Gamma_N, \Pi]$, where r is the immediate reward, $\pi$ is the followed policy which can be found such that $V^*(\Gamma_N) = \max V^\pi(\Gamma_N)$, $\forall \gamma_n^P \in R$, n=1, ...,N. Given $V^*(\Gamma_N)$, the optimal policy $\pi^*$ is found by selecting the best cell-free network partitioning configuration that maximizes $E_{\Gamma_{0N} \sim T(\Gamma_{0N}|\Gamma_N, C_j)}[V^* (\Gamma_N^0)]$, where T ($\Gamma^0_N|\Gamma_N, C_j$) is the transition dynamics that is usually unavailable. Hence, the value function is replaced by a quality stateaction-value function $Q^\pi(\Gamma_N, C_j)$, which is different from $V^\pi$ due to the fact that a random cell-free network partitioning configuration action $C_0$ is provided and the policy $\pi$ is only counted from the succeeding state, i.e. $Q^\pi(\Gamma_N, C_j) = E[r|\Gamma_N, C_j, \pi]$. The learning of the $Q^\pi$ network is performed by using the Bellman equation with the recursive form $Q^\pi(\Gamma_N, C_j) E_{\Gamma_{0N}}[r^0 + \zeta Q^\pi(\Gamma_{0N}, \pi(\Gamma_N^0))][42]$. This means that the quality function can be improved by bootstrapping (i.e. using current values of $Q^\pi$ to improve our estimate). This modeling is the basis of Q-learning [38] and SARSA

[39] algorithms that is defined as $Q^\pi(\Gamma_N,C_j) \leftarrow Q^\pi(\Gamma_N,C_j) + \alpha\delta$, where $\alpha$ is the learning rate and $\delta = Y - Q^\pi(\Gamma_N,C_j)$ is the temporal difference error with Y representing a target (as in standard regression problems). Using the Q-learning cell-free network partitioning agent, the target Y directly approximates $Q^*$ by setting $Y = r + \zeta \max Q^\pi(\Gamma^0{}_N, C_j)$ (off-policy agent), where $\zeta$ is the discount factor. On the other hand, the SARSA algorithm improves the estimate of $Q^\pi$ by deriving a behavioural policy from $Q^\pi$. This is achieved by setting $Y = r + \zeta Q^\pi(\Gamma_N', C_j')$ (on-policy agent).

Policy-based DRL method for clustering: In policy gradient (PG) algorithms, the modeling and optimization of a certain policy is conducted directly through a parameterized function, $\mu_\theta(C_j,\Gamma_N)$. The value of the objective function (the reward) directly depends on the policy. The value of the reward function for PG-based clustering is given by $$J(\theta) = \sum_{s_c \in \mathbb{R}^N} d^\mu(\Gamma_N) V^\mu(\Gamma_N) = \sum_{s_c \in \mathbb{R}^N} d^\mu(\Gamma_N) \sum_{j \in \mathbb{Z}} \mu_\theta(C_j|\Gamma_N) Q^\mu(\Gamma_N, C_j), \quad (19)$$

where $d^\mu(\Gamma_N)$ is the stationary state distribution of Markov chain. Note that the gradient of $J(\theta)$ (denoted by $\nabla_\theta J(\theta)$) depends both on the selected actions $a_c$ and the stationary distribution $d^\mu(\Gamma_N)$. A PG algorithm simplifies the computation of the gradient by removing the dependence of $J(\theta)$ on $d^\mu(\Gamma_N)$ as follows [36, Sec. 13.2]:

$$\nabla_\theta J(\theta) = \nabla_\theta \sum_{s_c \in \mathbb{R}^N} d^\mu(\Gamma_N) \sum_{j \in \mathbb{Z}} \mu_\theta(C_j|\Gamma_N) Q^\mu(\Gamma_N, C_j) \propto \sum_{s_c \in \mathbb{R}^N} d^\mu(\Gamma_N) \sum_{j \in \mathbb{Z}} \mu_\theta(C_j|\Gamma_N) \nabla_\theta Q^\mu(\Gamma_N, C_j). \quad (20)$$

The general policy gradient method has a high variance. Accordingly, the following general form is used as a foundation of different PG algorithms:

$$\nabla_\theta J(\theta) = \mathbb{E}_{\mu_\theta}\left[\sum_{t=0}^{T-1} G_t \nabla_\theta \log \mu_\theta(C_j|\Gamma_N)\right]. \quad (21)$$

The PG-based DRL model for network partitioning can be then trained through the following steps:
i) Initialize the actor $\mu(\Gamma_N)$ with random weights $\theta_\mu$.
ii) For each training episode (i.e. every T training steps), generate the experiences by following $\mu(\Gamma_N)$: the actor generates the probability values for each possible cell-free partitioning, then the DRL agent randomly selects an action based on a certain probability distribution. This process continues for T steps.
iii) At each step of a certain episode, calculate the return value $$G_t = \sum_{l=t}^{T} \zeta^{l-1} r_l.$$

iv) Find the cumulative sum of the actor network gradients during one entire learning episode as $$d\theta_\mu = \sum_{t=1}^{T} G_t \nabla_{\theta_\mu} \ln \mu(\Gamma_N|\theta_\mu). \quad (22)$$

v) Updated the actor network using $\theta_\mu \leftarrow \theta_\mu + \alpha d\theta_\mu$ where $\alpha$ is learning rate.

(Actor-critic)-based DRL method: In the PG-based partitioning algorithm, the value function $G_t$ is estimated based on a preassigned policy. However, the estimation of Gt for a predefined policy introduces a relatively high variance of the policy gradient which in turn reduces the quality of cell-free network partitioning action. In order to tackle the high variance problem, a second DNN can be used that can accurately learn the value of $G_t$[43].

As discussed hereinbefore, the downlink beamforming is performed through two consecutive stages, namely, analog beamsteering and digital beamforming. A mixed DRL-cumconvex optimization subsystem performs the two-stage beamforming operation for each cell-free subnetwork (FIG. 3B). In the proposed system, the non-convex analog beamsteering (problem $P_2$, which is a non-convex combinatorial optimization problem) is solved by training a DRL agent that "interacts" with the propagation medium (i.e. DRL environment) on a time-slot basis. The convex digital beamforming problem $P_3$, which is a strictly convex optimization problem, on the other hand, is solved within the DRL environment by using conventional convex optimization methods (e.g. Newton and Broyden methods). (The Lagrangian function of $P_3$ is twice differentiable with respect to all optimization variables [44].) This process of hybrid analog beamsteering-digital beamforming is performed independently at each subnetwork on a time-slot basis.

Table III shows the main design parameters of the DRL model. Note that the operation of digital beamforming is performed as a part of the DRL environment computations that produce the observed states and reward for the analog beamsteering agent. The proposed subsystem can be implemented by using several DRL algorithms. In this disclosure, two DRL algorithms with continuous action space are implemented and benchmarked, namely, the PG algorithm and the Soft Actor-Critic Agents (SAC) algorithm.

Policy-based beamsteering: The PG algorithm used previously for cell-free network partitioning can be also implemented to learn the best beamsteering vectors by solving problem $P_2$. This can be achieved by optimizing over the discrete action space and then estimating the best continuous beamsteering action. Such an approximation process is relatively slow/inefficient. However, working directly with policies that emit probability distributions can increase the estimation speed of the continuous action space since sampling a well-known distribution is easier than sampling from value functions.

Soft actor-critic beamsteering: On-policy actor-critic algorithms improve the stability of the network by allowing random exploration of experience from actions replay buffers [36]. However, this on-policy training results in a poor sample complexity. On the other hand, off-policy algorithms have been developed to improve the sampling efficiency while maintaining robustness by developing more advanced variance reduction techniques and at the same time incorporating the off-policy samples (e.g. the DDPG family of algorithms) [45]. However, the interaction between the off-policy DDQN value estimator and the deterministic actor setting makes DDPG extremely difficult to stabilize and adjust the hyper-parameter settings. This issue becomes more severe as the size of the cell-free network increases. The SAC algorithm solves the beamsteering problem at each cell-free subnetwork [46, Algorithm 1]. The SAC algorithm enables off-policy actor-critic training with a stochastic actor. The main difference between the SAC algorithm and the GP and AC ones is that the SAC algorithm uses a general objective that maximizes entropy along with the cumulative reward [47]. The addition of policy entropy encourages the actor network to explore new experiences. Accordingly, the expected reward in Eq. (21) can be modified to [47]

$$\nabla_{\theta_\mu} J(\theta_\mu) = \nabla_{\theta_\mu} \sum_{t=0}^{T-1} E_{(\Gamma_n^{\{C_j\}}, F_n) \sim \rho_{\theta_\mu}} \left[ r\left(\Gamma_n^{\{C_j\}}, F_n\right) + \alpha \mathcal{H}\left(\mu\left(F_n \middle| \Gamma_n^{\{C_j\}}\right)\right) \right], \quad (23)$$

where $\Gamma_n^{\{C_j\}} = \left\{ \gamma_1^{\{C_j\}}, \ldots, \gamma_{D_{n,j}^U}^{\{C_j\}} \right\}$, $\mathcal{F}_n = \left\{ \delta_{k_n}, \mathcal{A}_{m_n} \right\}_{k_n=1,\ldots,D_{n,j}^U}^{m_n=1,\ldots,D_{n,j}^A}$, and H(·) is the entropy measure of the policy $\mu(\mathcal{F}_n | \Gamma_n^{\{C_j\}})$ is a temperature factor that determines the relative importance of the policy entropy against the reward r ($\Gamma_n^{\{C_j\}}$, $\mathcal{F}_n$), and $\rho_\mu(\Gamma_n^{\{C_j\}})$ and $\rho_\mu(\Gamma_n^{\{C_j\}}, \mathcal{F}_n)$ are the state and state-action of the trajectory distribution introduced by $\mu(\mathcal{F}_n | \Gamma_n^{\{C_j\}})$. The soft state-value function of SAC algorithm is given by [46]

$$V(\Gamma_n^{\{C_j\}}) = E_{\alpha_b \sim \mu}[Q(\Gamma_n^{\{C_j\}}, F_n) - \log \mu(F_n | \Gamma_n^{\{C_j\}})]. \quad (24)$$

Accordingly, the soft Q-value will be defined as [46]

$$Q\left(\Gamma_n^{\{C_j\}}, F_n\right) = r\left(\Gamma_n^{\{C_j\}}, F_n\right) + \gamma E_{\Gamma_n^{\{C_j\}'} \sim \rho_\mu(\Gamma_n^{\{C_j\}'})} Q\left[\left(\Gamma_n^{\{C_j\}'}, F_n'\right) - \log \mu\left(F_n' \middle| \Gamma_n^{\{C_j\}'}\right)\right]. \quad (25)$$

The SAC algorithm aims to learn three functions, namely, i) a policy function with parameters θ and $\pi_\theta$, ii) a soft Q-value function approximated (parameterized) by w and $Q_w$, and iii) a soft state value function parameterized by ψ and $V_\psi$. The soft state value is trained to minimize the mean square error with gradient function given as follows [46]:

$$\nabla_\psi J_V(\psi) = \nabla_\psi E_{\Gamma_n^{\{C_j\}} \sim \mathbb{R}} \frac{1}{2} \left[ V_\psi\left(\Gamma_n^{\{C_j\}}\right) - E\left[Q_w\left(\Gamma_n^{\{C_j\}}, F_n\right) - \log \pi_\theta\left(F_n \middle| \Gamma_n^{\{C_j\}}\right)\right] \right]^2 \quad (26)$$

$$\approx \nabla_\psi V_\psi\left(\Gamma_n^{\{C_j\}}\right) \left( V_\psi\left(\Gamma_n^{\{C_j\}}\right) - Q_w\left(\Gamma_n^{\{C_j\}}, F_n\right) + \log \pi_\theta\left(F_n \middle| \Gamma_n^{\{C_j\}}\right) \right),$$

where R is the distribution of previously sampled actions and states (in the replay buffer). Furthermore, the soft Q function is trained to minimize the soft Bellman residual with gradient function given as $$\nabla_w(, J)_Q(w) = \nabla_w \mathbb{E}_{(\Gamma_n^{\{C_j\}}, \mathcal{F}_n) \sim R} \left[ \frac{1}{2} \left( Q_w\left(\Gamma_n^{\{C_j\}}, \mathcal{F}_n\right) - \left( r\left(\Gamma_n^{\{C_j\}}, \mathcal{F}_n\right) \right. \right. \right. \quad (27)$$

$$\left. \left. \left. + \zeta \mathbb{E}_{\Gamma_n^{\{C_j\}'} \sim \rho_\mu(\Gamma_n^{\{C_j\}'})} \left[ V_{\bar{\psi}}\left(\Gamma_n^{\{C_j\}'}\right) \right] \right) \right)^2 \right]$$

$$\approx \nabla_w Q\left(\Gamma_n^{\{C_j\}}, \mathcal{F}_n\right) \left( Q_w\left(\mathcal{F}_n, \Gamma_n^{\{C_j\}}\right) - r\left(\Gamma_n^{\{C_j\}}, \mathcal{F}_n\right) - \zeta V_{\bar{\psi}}\left(\Gamma_n^{\{C_j\}'}\right) \right)$$

where $\bar{\psi}$ is an exponentially moving average target function. The desired policy is then trained using the information projection that is defined in terms of Kullback-Leibler (KL)-divergence [48]. Accordingly, the policy is updated according to $$\pi_{new} = \text{argmax}_{\pi' \in \Pi} D_{KL}\left( \pi'\left(\cdot \middle| \Gamma_n^{\{C_j\}}\right) \middle\| \frac{\exp\left\{ Q^\pi \text{old}\left(\Gamma_n^{\{C_j\}},\right) \right\}}{Z^\pi \text{old}\left(\Gamma_n^{\{C_j\}},\right)} \right), \quad (28)$$

where Π denotes a set of potential policies that π must restricted to $Z^{\pi^{old}}(\Gamma_n^{\{C_j\}})$ is a partitioning function that is used for normalizing the distribution. The objective update function of the policy $\pi_\theta$ is [46]

$$\nabla_\theta J_\pi(\theta) = D_{KL}\left( \pi_\theta\left(\cdot \middle| \Gamma_n^{\{C_j\}}\right) \middle\| \exp\left\{ Q_w\left(\Gamma_n^{\{C_j\}}, \mathcal{F}_n\right) - \log Z_w\left(\Gamma_n^{\{C_j\}}\right) \right\} \right) \quad (29)$$

$$= \mathbb{E}_{\mathcal{F}_n \sim \pi} \left[ -\log\left( \frac{\exp\left\{ Q_w\left(\Gamma_n^{\{C_j\}}, \mathcal{F}_n\right) - \log Z_w\left(\Gamma_n^{\{C_j\}}\right) \right\}}{\pi_\theta\left(\mathcal{F}_n \middle| \Gamma_n^{\{C_j\}}\right)} \right) \right]$$

$$= \mathbb{E}_{\mathcal{F}_n \sim \pi} \left[ \log \pi_\theta(\mathcal{F}_n | s_b) - Q_w\left(\Gamma_n^{\{C_j\}}, \mathcal{F}_n\right) + \log Z_w\left(\Gamma_n^{\{C_j\}}\right) \right]$$

We use the SAC algorithm developed in [46, Algorithm 1].

Figure 7:
FIG. 7 illustrates an algorithm used in the present invention.

Algorithm 1 (FIG. 7) shows the sequence of processes performed during network operation, where $E_c$ and $E_b$ are the number of episodes for the DRL models used for clustering and beamsteering, respectively, $T_c$ and $T_b$ are the number of training steps in each episode for the DRL models used for clustering and beamsteering, respectively.

To solve problem $P_1$ in (6), the following subproblems will be solved: the combinatorial problem related to selecting the best network partitioning configuration, the non-convex problem related to finding the best beamsteering matrices (problem $P_2$ in (14)), and a convex optimization problem related to finding the optimal digital beamforming at each eAP.

Hereinafter is discussed how the complexity of finding best network partitions grows exponentially with increasing values of M, K, and N, as can be seen from (18). Furthermore, solving $P_2$ in (14) through an exhaustive search with a step size Δ will have a complexity of order $$O\left( \prod_{n=1}^{N} \left(\frac{1}{\Delta}\right)^{(a \times D_{n,j}^A) \times (u \times D_{n,j}^U)} \right).$$

Since the problem $P_3$ in (17) is strictly convex, the solution for this problem has a computational complexity of $$O\left( \left( \sum_{n=1}^{N} D_{n,j}^U \times D_{n,j}^A \right)^3 \right).$$

To evaluate the time-complexity of a deep neural network used in a DRL model, the conventional measure is the floating-point operations per second (FLOPs). For any fully connected layer $L_i$ of input size $I_i$ nd output size $O_i$, the number of FLOPs is given by $FLOPS(L_i) = 2 I_i O_i$. The policy network has two hidden layers of size 256 and 128. Thus, for the DRL models, the total number of FLOPS during the inference is $$FLOPs_{DRL} = \sum_{i=1}^{3} FLOPs(\mathbb{L}_i) \quad (30)$$

$$= 2 \cdot (256 \cdot |S| + 128 \cdot |A| + 32768)$$

where $|S|$ and $|A|$ are the dimensions of the state space and action space, respectively. Table IV compares the FLOPS for inference as well as the convergence rate for the DRL algorithms used in this paper. Note that for network clustering, the dimensionality of the action space is $|A|=1$. Similarly, the complexity and convergence properties for the considered beamsteering agents are summarized in Table V. (The ellipsoid method comprises a total of $O([((D_{n,j}^A \times D_{n,j}^U) \times (\alpha \times u)]^4_q)$ operations, where q is the length of binary coding of the input.) $M_n$ in Table V represents the dimensionality of the analog beamsteering problem and is given by $\mathcal{M}_n(D_{n,j}^A \times D_{n,j}^U) \times (\alpha \times u)$. (The type of network will depend on the utilized clustering and beamsteering techniques). In terms of signaling overhead, in the proposed methods, the NCC first will have to collect the estimated CSI matrices from distributed eAPs and send full CSI to the ECP of each cell-free subnetwork. Next, the NCC will collect the performance metric (e.g. sum-rate) from the ECP of each subnetwork and use it to decide on the new network partitioning configuration. Furthermore, for fully digital beamforming, each single antenna will be assigned one RF chain that is responsible for baseband processing (digital beamforming) of the UE signals. However, by partitioning the overall cell-free network and introducing the first stage of analog beamsteering scheme (in the passband), the number of RF chains at each AP is significantly reduced to cover only UEs in each cell-free subnetwork individually.

Table VI presents the values of different parameters used in generating the simulation results. All the results for the conventional methods are produced using Mont-Carlo simulations each with $10^6$ runs. Additionally, it is assumed that all channel small-scale fading gains $h_{k_n m_n}$ are drawn from a set of i.i.d random variables. It is assumed that all APs and UEs are uniformly distributed over a disc of radius 18 m (corresponding to a network total coverage area of 1 km$^2$).

Figure 4A:
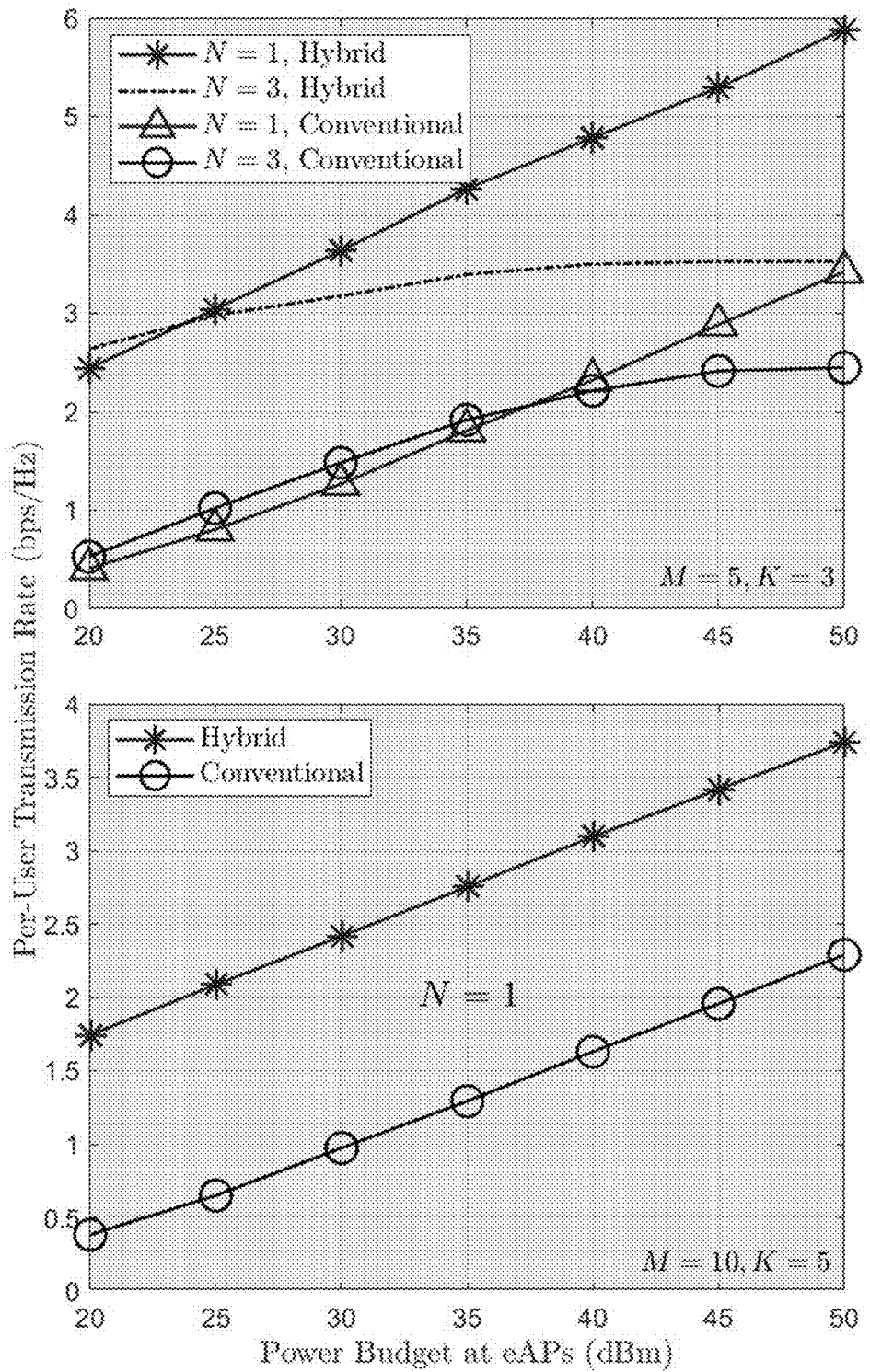
FIGS. 4A and 4B are graphs comparing performance of hybrid and conventional beamforming techniques.
Figure 4B:
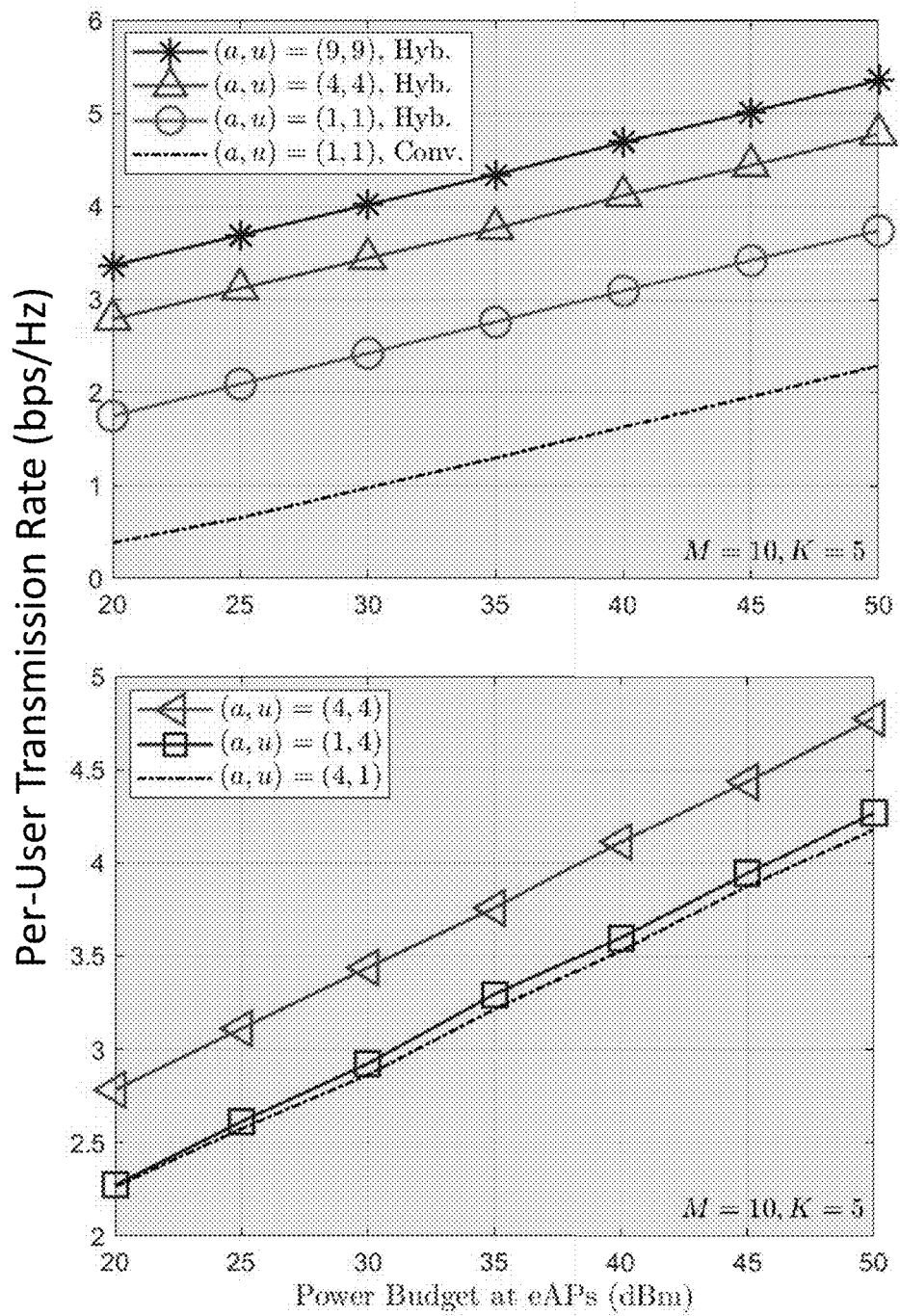

Initially, the performance of the proposed network architecture under the designed hybrid beamforming system (FIG. 4A) is evaluated. It can be noticed from this figure that the designed hybrid analog beamsteering-digital beamforming scheme significantly outperforms that of conventional (all digital) beamforming scheme. For example, a gain of 2.3 bps/Hz and 1.5 bps/Hz are achieved at 35 dBm with N=1 and N=2, respectively (upper graph in FIG. 4A). Interestingly, even without network partitioning (i.e. for N=1), our proposed hybrid beamforming scheme shows significant increase in performance compared to its conventional beamforming counterpart. The reason is that our designed objective function for beamsteering (see Problem $P_2$ in (14)) aims to enhance beams of desired UEs and "zero-null" beams to undesired UEs at the same time. Accordingly, with N=1, beamsteering will focus on optimally directing the antenna main lobes of APs and UEs to each other. However, this performance gain is observed to decrease as the network scales up (see lower graph of FIG. 4A). In order to study the effect of multiple antennas on the per-UE rate performance, FIG. 4B shows per-UE transmission rate versus different MIMO layouts. It can be noticed that a significant increase in per-UE rate performance can be achieved by increasing the number of antennas at the UEs and eAPs (upper graph of FIG. 4B). This rate enhancement, however, decreases as the values of α and/or b increase (due to increased interference levels). Furthermore, the system performance enhances better as the antenna order at the UEs increases more than that at the eAPs (lower graph of FIG. 4B).

The performances of the DRL models for network partitioning and analog beamsteering are investigated separately. This is done by first training the different DRL clustering agents while using conventional methods for hybrid analog beamsteering-digital beamforming operations. On the other hand, the DRLbased beamforming methods are evaluated while clustering is performed through the trained DRL agents in the inference mode. This separate evaluation enables us to extract more insights on the performances of that DRL models under discrete and continuous action spaces.

Figure 5A:
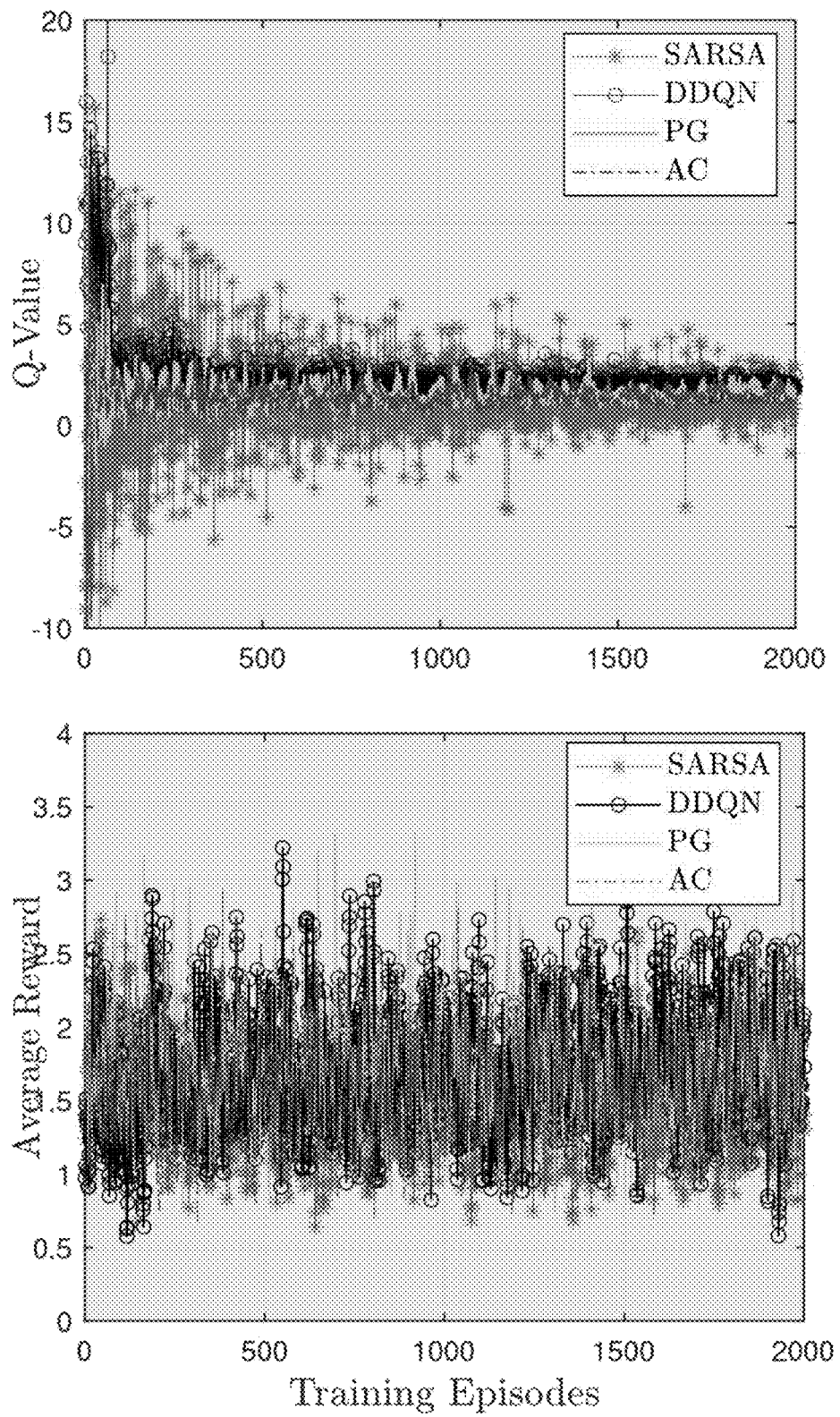
FIGS. 5A and 5B are graphs showing performance of fixed CSI and varying CSI clustering agents, respectively, in terms of Q-value and average reward.

We start by evaluating the performances of the DRL-based clustering algorithms for the proposed self-partitioning cell-free network architecture (FIG. 5A). Two training modes are used for each of the studied DRL algorithms. The first training mode considers a fixed CSI (i.e. constant H matrix), while in the second mode, there are different CSI realizations at every training step of each episode. In FIG. 5A, four DRL agents are trained using PG, DDQN, SARSA, and AC algorithms for network partitioning for a single CSI realization. As can be observed, the PG algorithm provides the best clustering performance in terms of stability and convergence, while the DDQN algorithm comes second, and the SARSA algorithm comes last with significantly high covariance in the Q-values per episode and slower convergence rate (upper graph in FIG. 5A). In terms of per-UE rate performance, even though all of the three algorithms show relatively similar performance levels, however, with a closer look, one can find out that the PG algorithm provides the highest per-UE transmission rate.

Figure 5B:
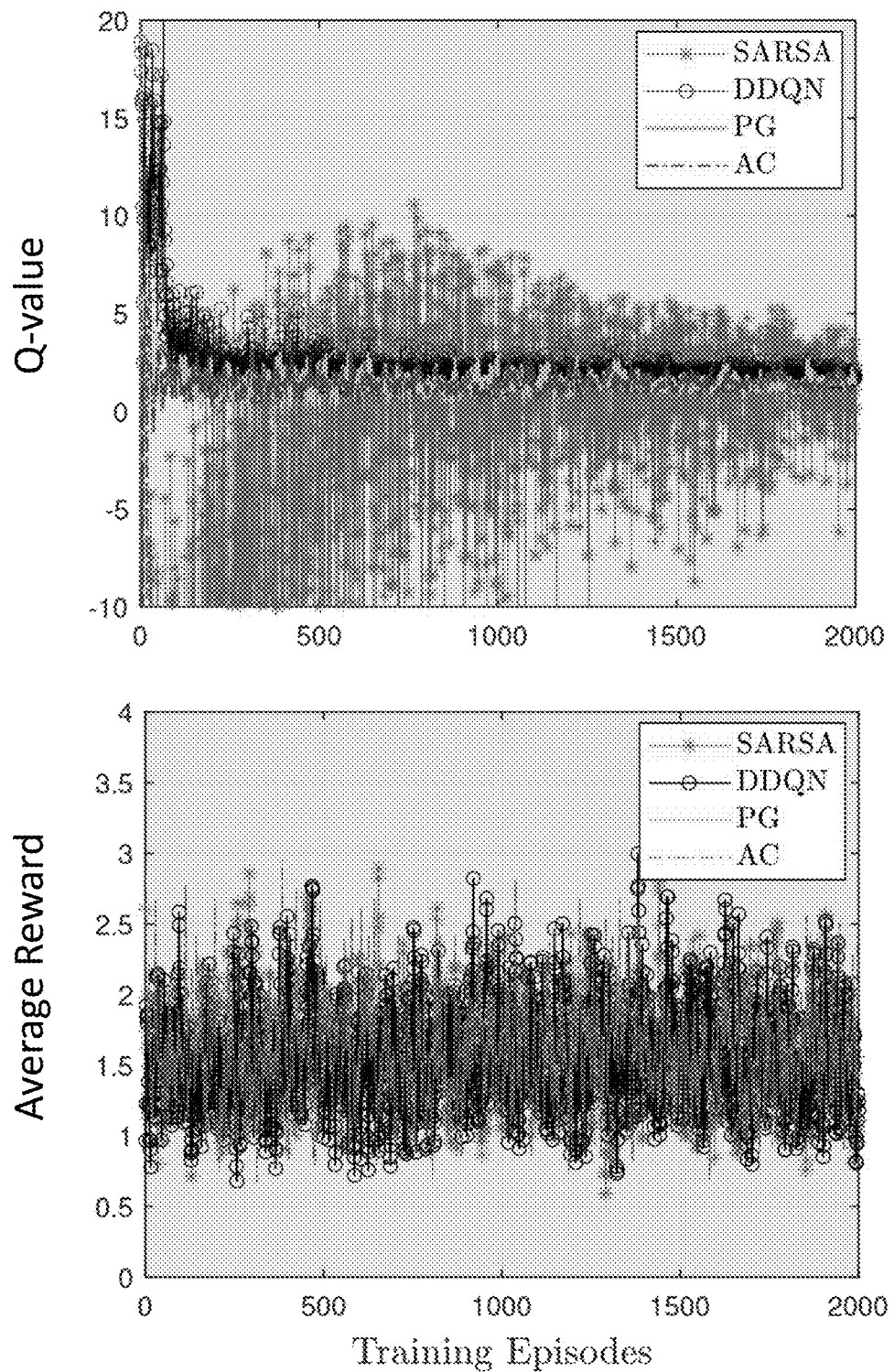

FIG. 5B evaluates the effect of training DRL agents during the real-time operation of the cell-free network. Specifically, it is assumed that a training step is performed during one time slot. This means that, state transitions of the DRL model will result from both current action a and the instantaneous CSI H.

Figure 6A:
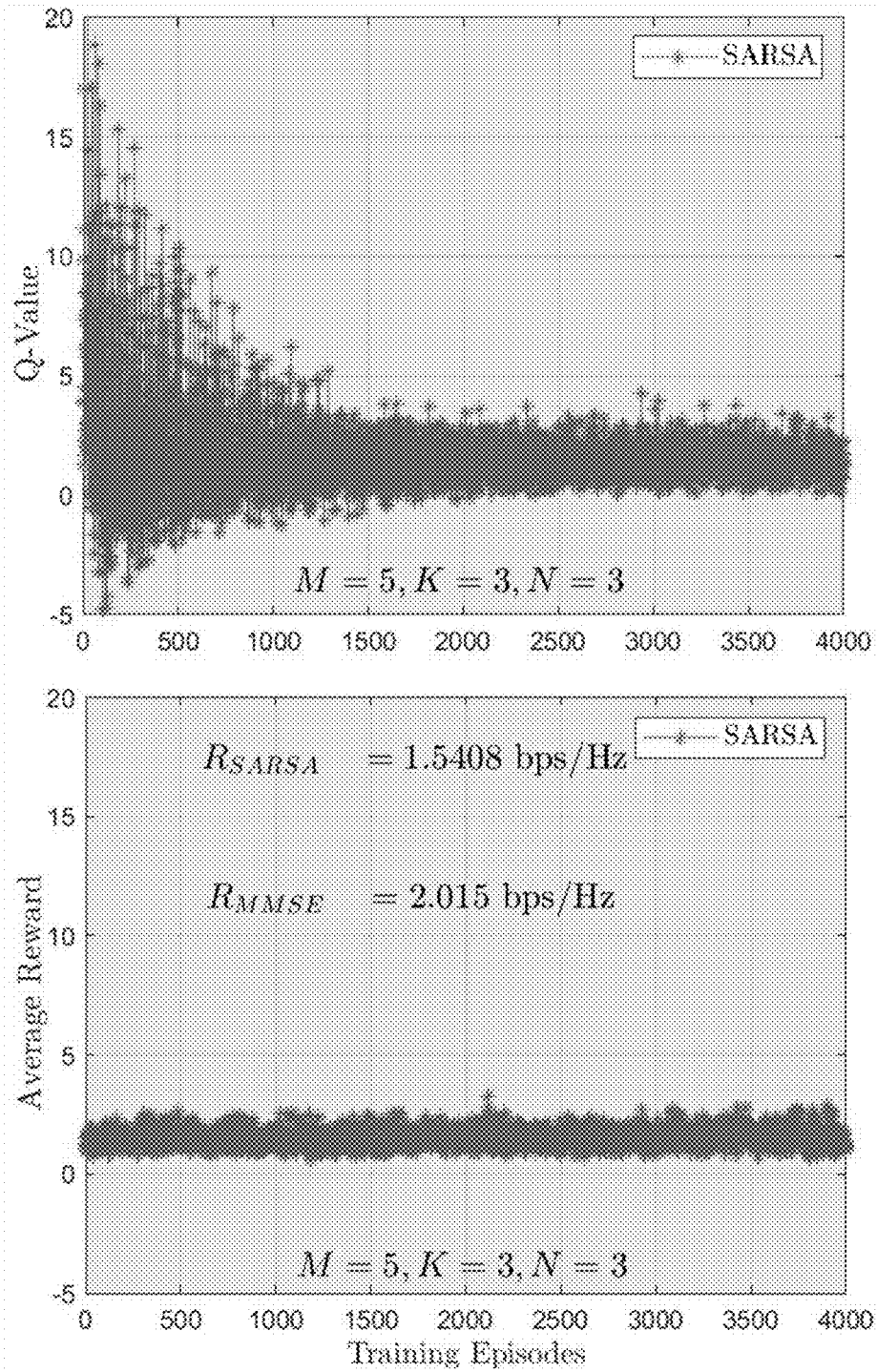
FIGS. 6A and 6B are graphs showing performance of different clustering agents.
Figure 6B:
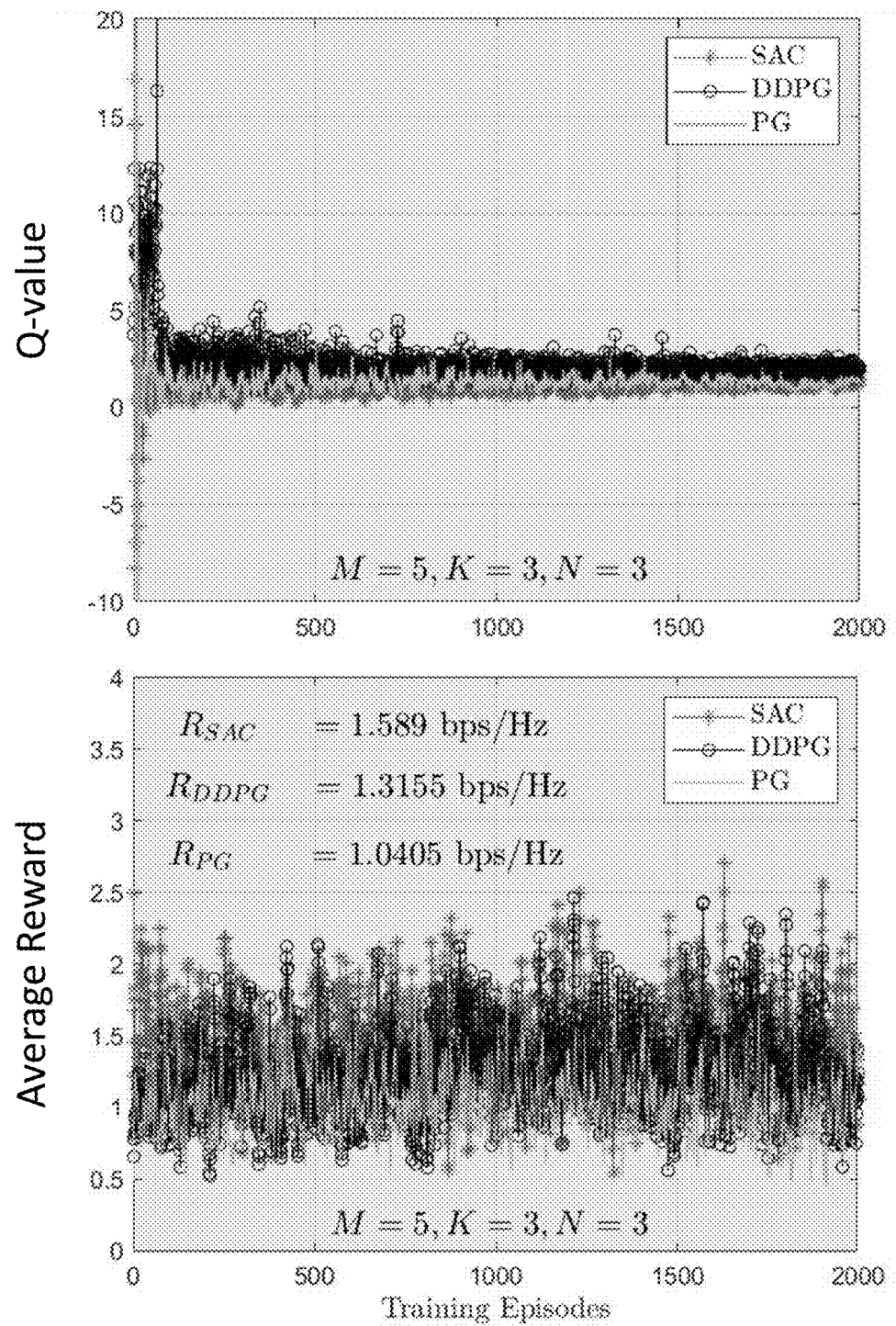

It can be observed from FIG. 5B that changing H during training of the clustering agents has a negative impact on both the convergence rate and the per-UE rate performance. This can be observed clearly by the significant increase in the variance of the Q-values in the upper graph of FIG. 5B. It can also be observed that the convergence of the SARSA-based clustering is the worst. For SARSA, to tackle the weak stability issue, the number of training episodes are doubled from 2000 to 4000 episodes and retrain the SARSA agent under varying CSI conditions (FIG. 6A). As can be observed from this figure, increasing the number of episodes improves the stability of the SARSA algorithm significantly. However, with more training episodes the per-UE rate performance does not improve (with average reward of around 1.5408 bps/Hz). It can also be noticed that both the SARSA and SAC algorithms can achieve up to 75% of what can be achieved using the MMSE beamforming algorithm. However, the reduction in performance is compensated by a significant decrease in hardware and computational complexity. Furthermore, as shown in FIGS. 5A and 5B, it takes around 500 episodes for the DRL used for clustering to reach its maximum performance. It has been shown that, in the inference mode, it takes around 2 ms for the overall DRL system to produce an optimal solution (i.e. best network partitioning configurations and corresponding beamforming matrices. (For a given network partitioning configuration, with (M,K,N)=(5,3,3) and 4 antennas in each node, it takes on average 2.3 seconds to get the optimal beamforming matrices for the overall network (using Matlab tic-to command in CVX). More numerical results on the performances of the DRL-based clustering schemes are given in Table VII. It can be observed that the off-policy algorithm (i.e. DDQN) gives the worst performance under varying CSI conditions. This is due to the fact that the DDQN agent selects the action related to the highest Q-value in a deterministic fashion, without any exploration. This action-selection strategy will prevent the network from learning/sensing the stochastic variations of the states (or alternatively the CSI matrix H). On the other hand, all of the on-policy based algorithms (PG, SARSA, and AC) show good performance under varying CSI, and there is a noticeable enhancement on per-UE rate performance due to the AC algorithm. The reason is that the AC algorithm allows the DRL agent to learn the stochastic properties of the state (or alternatively, the CSI matrix H). Finally, FIG. 6B evaluates and compares the performance of several DRL-based beamsteering methods. For these simulations, the inference mode of the DDQN algorithm solves the network partitioning problem. It can be noticed that the AC algorithm shows the best per-UE rate performance compared to the DDPG and PG algorithms. Furthermore, when both network clustering and analog beamsteering are implemented through the DRL agents, the per-UE rate performance of the SAC algorithm drops to around 70% of the optimal performance, and for the PG algorithm, it is 51% of the optimal performance.

A novel self-partitioning MIMO cell-free network architecture has been proposed in which a cell-free network is partitioned into a set of independent cell-free subnetworks. To efficiently solve the problem of network partitioning for a large-scale network, this disclosure has proposed, evaluated, and benchmarked several state-of-the-art DRL methods with discrete action space. Furthermore, to reduce the interference between adjacent cell-free subnetworks, a novel downlink hybrid analog beamsteering-digital beamforming scheme is designed. Also, several state-of-the-art DRL methods with continuous action space solve the combinatorial problem of analog beamsteering while the digital beamforming problem has been solved as a strictly convex optimization problem. Results have shown a significant rate enhancement and complexity reduction due to the proposed hybrid beamforming scheme compared to its conventional all-digital counterpart. It has been observed that online training of different DRL agents is only slightly affected by changing the CSI in the network. However, changing the CSI can significantly affect the variance and convergence rate of the DRL algorithms such as the SARSA algorithm. Furthermore, it has also been noticed that all DRL methods for network clustering and beamsteering have almost the same per-UE rate performance with a slight superiority of the PG and AC algorithms when used for network clustering and analog beamsteering, respectively. A potential extension of this work is to enable distributed beamforming at each cell-free subnetwork. This may be achieved by utilizing a multiple agent algorithm with continuous action space. Another extension of this work is to solve the problem of pilot assignment using distributed multiple agent DRL modeling.

As described hereinbefore, in one aspect, the present invention relates to a novel downlink cell-free multiple-input multiple-output (MIMO) millimeter wave (mmWave) network architecture that enables all APs and UEs to dynamically self-partition into a set of independent cell-free subnetworks in a time-slot basis. To achieve this, there are provided several network partitioning algorithms based on deep reinforcement learning (DRL). Furthermore, to mitigate interference between different cell-free subnetworks, there is provided a novel hybrid analog beamsteering-digital beamforming model that zero-forces interference among cell-free subnetworks and at the same time maximizes the instantaneous sum-rate of all UEs within each subnetwork. Specifically, the hybrid beamforming model is implemented by using a novel mixed DRL-convex optimization method in which analog beamsteering between APs and UEs is conducted based on DRL while digital beamforming is modeled and solved as a convex optimization problem. The DRL models for network clustering and hybrid beamsteering are combined into a single hierarchical DRL design that enables exchange of DRL agents' experiences during both network training and operation. Performance of DRL models for clustering and beamsteering is demonstrated in terms of network performance, convergence rate, and computational complexity. Results show a significant rate enhancement and complexity reduction of the proposed hybrid beamforming scheme compared to its conventional all-digital counterpart. This performance enhancement becomes more significant as the number of network partitions increases. For DRL-based network clustering, the policy gradient (PG) algorithm offers the best possible performance in terms of stability and convergence rate while the state-action-reward-state-action (SARSA) algorithm suffers from significant variance, slower convergence, and slightly inferior performance than other algorithms. For DRL-based beamsteering, the soft actor-critic (SAC) algorithm with continuous action space shows the best performance. Also, online training of the agents with varying channel state information (CSI) is observed to increase the variance of the Q-values and decrease the convergence rate, with no significant effect on the average reward.

There is disclosed a very general network-centric clustering to partition the UEs and eAPs to different subnetworks.

For a cell-free network, the complexity of solving the beamforming problem in a centralized manner can be reduced by partitioning the network into a group of cell-free subnetworks, each with independent set of APs and UEs. However, fixed partitioning will not be performance-efficient under fast-varying channel conditions and varying number of UEs per unit area. Therefore, dynamic partitioning into subnetworks based on current network and channel status will be desirable, and for practical feasibility, low-complexity solutions will be desired. Accordingly, a novel mmWave MIMO cell-free network architecture is designed based on dynamic partitioning (or clustering) along with a hybrid analog-digital downlink beamforming method by using DRL techniques. The proposed design provides us with efficient and implementation-friendly solutions.

The main contributions of this disclosure may be summarized as follows:

For a mmWave MIMO cell-free network, a self-organizing network architecture dynamically partitions the network into a group of subnetworks, each acting as an independent cell-free architecture;

To simultaneously mitigate inter-subnetwork interference (ISNI) and intra-UE interference (IUI) while maximizing the per-UE transmission rate, there is developed an innovative hybrid analog beamsteering-digital beamforming method for the proposed mmWave MIMO cell-free network;

The problem of joint network partitioning, analog beamsteering, and digital beamforming is solved through a novel DRL-cum-convex optimization model. Specifically, the model consists of two interacting networks: i) one DRL model with discrete-action subspace for UE and AP clustering, ii) and another DRL model with continuous-action subspace used for analog beamsteering, the first step of the proposed hybrid beamforming method. The second step of digital beamforming is formulated and solved as a convex optimization problem within the environment of the DRL agent for analog beamsteering;

For network partitioning and beamforming, several DRL algorithms are benchmarked and their performances are evaluated under different system parameters.

In yet other words, there is disclosed herein a wireless communication network for a plurality of user devices distributed in a geographical area. The wireless communication network comprises:

a plurality of access points having antennas and configured to wirelessly communicate with the user devices, wherein each of the access points further includes a processor and a non-transitory memory operatively connected to the processor and storing instructions to be executed thereon; and a central server having a processor and a non-transitory memory operatively connected to the processor and storing instructions to be executed thereon, wherein the central server is communicatively connected to the access points and configured to control the wireless communication network.

The access points are arranged at spaced locations across the geographical area and are grouped, based on channel state information, to form a plurality of communication clusters each in wireless communication with a subset of the user devices in geographically proximal location thereto.

Each communication cluster and the subset of the user devices communicated therewith forms a subnetwork, and the subnetworks are arranged for wireless communication in non-overlapping portions of the geographical area. The access points of a common subnetwork are configured to wirelessly exchange data with the user devices of the subnetwork using a common frequency range. Each of the communication clusters comprises an edge computing device formed by one or more of the access points belonging thereto and configured to exchange data with the central server.

In the illustrated arrangement, main lobes of the antennas of the access points of a common subnetwork are arranged to be directed towards the user devices of the subnetwork.

In the illustrated arrangement, side lobes of the antennas of the access points of a common subnetwork are arranged to be directed towards the user devices of different subnetworks.

In the illustrated arrangement, directions of lobes of the antennas of the access points of a common subnetwork are determined by the edge computing device of the subnetwork.

In the illustrated arrangement, the communication clusters are determined by the central server.

In the illustrated arrangement, when at least some of the user devices are mobile, the communication clusters are periodically reformed.

In the illustrated arrangement, the communication clusters are configured to use different frequency ranges for communication with the subsets of the user devices.

In the illustrated arrangement, the communication clusters are formed by selecting, from all possible configurations of subnetworks including at least one of the access points and at least one of the user devices, a single one of the configurations based on an optimal set of analog beamsteering, digital beamforming and analog combining matrices.

In the illustrated arrangement, the optimal set of the analog beamsteering, digital beamforming and analog combining matrices is obtained by solving a combinatorial optimization problem.

In the illustrated arrangement, the combinatorial optimization problem is solved using a deep reinforcement learning-cumulative-convex solution.

There is also disclosed herein a method of forming a cell-free communication network, which has a central server and a plurality of distributed access points configured to communicate therewith and to wirelessly communicate with a plurality of distributed user devices. The method generally comprises the steps of:

based on communication channels formable between the access points and the user devices, grouping the access points into a plurality of communication clusters arranged to communicate with subsets of the user devices in geographically proximal location thereto, wherein each pairing of one of the communication clusters and a corresponding one of the subsets of the user devices in communication therewith forms a subnetwork; and selecting one or more of the access points of a common subnetwork as an edge computing device thereof, wherein the edge computing device is in communication with the central server for exchanging data and configuring the cell-free communication network.

In the illustrated arrangement, the step of grouping the access points into a plurality of communication clusters comprises selecting, from all possible configurations of subnetworks including at least one of the access points and at least one of the user devices, a single one of the configurations based on an optimal set of analog beamsteering, digital beamforming and analog combining matrices.

In the illustrated arrangement, the method further includes a step of solving a combinatorial optimization problem to obtain the optimal set of the analog beamsteering, digital beamforming and analog combining matrices.

In the illustrated arrangement, the step of solving a combinatorial optimization problem comprises applying a deep reinforcement learning-cumulative-convex solution to the combinatorial optimization problem.

In the illustrated arrangement, grouping the access points into a plurality of communication clusters comprises solving a combinatorial optimization problem to select a prescribed configuration of subnetworks, which includes selecting a prescribed arrangement of antenna beams in each subnetwork, and this step of solving a combinatorial optimization problem comprises applying a deep reinforcement learning algorithm thereto.

In the illustrated arrangement, the step of applying a deep reinforcement learning algorithm comprises applying a first deep learning agent of the algorithm to solve for the prescribed configuration of subnetworks and outputting an action thereof to an environment of the first deep learning agent in which a second deep learning agent of the algorithm is applied to solve for the prescribed arrangement of antenna beams in each subnetwork of the configuration output by the first deep learning agent.

In the illustrated arrangement, the step of applying the second deep learning agent to solve for the prescribed arrangement of antenna beams in each subnetwork comprises applying the second deep learning agent to solve an analog beamsteering problem and outputting an action thereof to an environment of the second deep learning agent in which a convex optimization problem associated with digital beamforming is solved.

In the illustrated arrangement, the second deep learning agent is applied over a continuous action space.

In the illustrated arrangement, when at least some of the user devices are mobile, grouping the access points into a plurality of communication clusters is periodically repeated.

Furthermore, there is disclosed herein a method of forming beams of antennas of access points in a cell-free communication network, which generally comprises:

when the access points are grouped to form a plurality of subnetworks in respective wireless communication with designated subsets of user devices, performing analog beamsteering, which comprises:
directing main ones of the beams of the antennas of the access points of a common subnetwork towards the user devices of the subnetwork to form a coverage area for one or more of said user devices; and
directing sides ones of the beams of the antennas of the access points of the common subnetwork towards the user devices of other subnetworks; and after analog beamsteering, performing digital beamforming, which comprises:
computing, for each access point of the common subnetwork, a direction and field strength of each main beam thereof to provide a prescribed transmission rate with each user device of the common subnetwork; and
generating each main beam according to the computed direction and field strength.

In the illustrated arrangement, analog beamsteering comprises computing a matrix which optimizes communication channels between all of the access points of the common subnetwork and the user devices thereof nullifies communication channels between all of the access points of the common subnetwork and the user devices of other subnetworks.

In the illustrated arrangement, analog beamsteering comprises computing a matrix which maximizes a sum of powers of multiple channel projections, a first one of which includes non-annihilating projections of an analog combining vector and an analog beamsteering matrix on a channel state information matrix for the common subnetwork and a second one of which includes an annihilating projection of the analog beamsteering matrix on a channel state information matrix of other subnetworks.

In the illustrated arrangement, computing a direction and field strength of each main beam of each access point of the common network comprises ranking signal quality of the user devices of the common network based on non-orthogonal multiple access effective channel gain normalized by a sum of squares of effective channel norms of all of the user devices of other subnetworks.

In the illustrated arrangement, analog beamsteering and digital beamforming are periodically repeated.

The scope of the claims should not be limited by the preferred embodiments set forth in the examples but should be given the broadest interpretation consistent with the specification as a whole.

REFERENCES

[1] H. Q. Ngo, A. Ashikhmin, H. Yang, E. G. Larsson, and T. L. Marzetta, "Cell-free massive MIMO versus small cells," IEEE Trans. on Wireless Commun., vol. 16, no. 3, pp. 1834-1850, March 2017.

[2] Y. Al-Eryani, M. Akrout, and E. Hossain, "Multiple access in cell-free networks: Outage performance, dynamic clustering, and deep reinforcement learning-based design," IEEE J. Select. Areas Commun., vol. 39, no. 4, pp. 1028-1042, 2021.

[3] Y. Jin, J. Zhang, S. Jin, and B. Ai, "Channel estimation for cell-free mmWave massive MIMO through deep learning," IEEE Trans. Veh. Technol., vol. 68, no. 10, pp. 10325-10329, 2019.

[4] G. Interdonato, H. Q. Ngo, P. Frenger, and E. G. Larsson, "Downlink training in cell-free massive MIMO: A blessing in disguise," IEEE Trans. on Wireless Commun., vol. 18, no. 11, pp. 5153-5169, 2019.

[5] E. Nayebi, A. Ashikhmin, T. L. Marzetta, H. Yang, and B. D. Rao, "Precoding and power optimization in cell-free massive MIMO systems," IEEE Trans. on Wireless Commun., vol. 16, no. 7, pp. 4445-4459, 2017.

[6] M. Alonzo, S. Buzzi, A. Zappone, and C. D'Elia, "Energy-efficient power control in cell-free and user-centric massive MIMO at millimeter wave," IEEE Trans. on Green Commun. and Networking, vol. 3, no. 3, pp. 651-663, 2019.

[7] M. Attarifar and et. al., "Modified conjugate beamforming for cell-free massive MIMO," vol. 8, no. 2, pp. 616-619, April 2019.

[8] Y. Al-Eryani, E. Hossain, and D. I. Kim, "Generalized coordinated multipoint (GCoMP)-enabled NOMA: Outage, capacity, and power allocation," IEEE Trans. on Commun., vol. 67, no. 11, pp. 7923-7936, Nov. 2019.

[9] E. Bjornson and L. Sanguinetti, "Scalable cell-free massive MIMO systems," IEEE Trans. on Commun., vol. 68, no. 7, pp. 4247-4261, 2020.

[10] L. Du, L. Li, H. Q. Ngo, T. C. Mai, and M. Matthaiou, "Cell-free massive MIMO: Joint maximum-ratio and zero-forcing precoder with power control," vol. 69, no. 6, pp. 3741-3756, 2021.

[11] M. Attarifar, A. Abbasfar, and A. Lozano, "Subset MMSE receivers for cell-free networks," IEEE Trans. on Wireless Commun., vol. 19, no. 6, pp. 4183-4194, 2020.

[12] F. Riera-Palou, G. Femenias, A. G. Armada, and A. Perez-Neira, "Clustered cell-free massive MIMO," in IEEE Globecom, 2018, pp. 1-6.

[13] X. Huang, X. Zhu, Y. Jiang, and Y. Liu, "Efficient enhanced k-means clustering for semi-blind channel estimation of cell-free massive MIMO," in IEEE Inter'l Conf. on Commun. (ICC'20), 2020, pp. 1-6.

[14] M. Kamel, W. Hamouda, and A. Youssef, "Ultra-dense networks: A survey," IEEE Commun. Surveys & Tutorials, vol. 18, no. 4, pp. 2522-2545, 2016.

[15] S. Buzzi and C. D'Andrea, "Cell-free massive MIMO: User-centric approach," vol. 6, no. 6, pp. 706-709, 2017.

[16] S. Buzzi, C. D'Andrea, A. Zappone, and C. D'Elia, "User-centric 5G cellular networks: Resource allocation and comparison with the cell-free massive mimo approach," vol. 19, no. 2, pp. 1250-1264, 2020.

[17] G. Interdonato, P. Frenger, and E. G. Larsson, "Scalability aspects of cell-free massive MIMO," in IEEE Int'l Conf. on Commun. (ICC'19), 2019, pp. 1-6.

[18] G. Interdonato, E. Bjornson, H. Quoc Ngo, P. Frenger, and E. G. Larsson, "Ubiquitous cell-free massive MIMO communications," EURASIP J. on Wireless Commun. and Net., vol. 2019, no. 1, p. 197, Aug. 2019.

[19] F. Fredj, Y. Al-Eryani, S. Maghsudi, M. Akrout, and E. Hossain, "Distributed uplink beamforming in cell-free networks using deep reinforcement learning," 2020.

[20] S. Chakraborty, E. Bjornson, and L. Sanguinetti, "Centralized and distributed power allocation for max-min fairness in cell-free massive MIMO," in 2019 53'rd Asilomar Conf. on Signals, Systems, and Computers, 2019, pp. 576-580.

[21] J. Garc'ia-Morales, G. Femenias, and F. Riera-Palou, "Energy-efficient access-point sleep-mode techniques for cell-free mmWave massive MIMO networks with non-uniform spatial traffic density," vol. 8, 2020, pp. 137587-137605.

[22] X. Zhang, J. Wang, and H. V. Poor, "Statistical delay and error-rate bounded QoS provisioning over mmWave cell-free mMIMO and FBC-HARQ-IR based 6G wireless networks," IEEE J. on Select. Areas in Commun., vol. 38, no. 8, pp. 1661-1677, 2020.

[23] R. W. Heath, N. Gonzalez-Prelcic, S. Rangan, W. Roh, and A. M. Sayeed, "An overview of signal processing techniques for millimeter wave MIMO systems," IEEE J. of Select. Topics in Sig. Process., vol. 10, no. 3, pp. 436-453, 2016.

[24] S. Zhou, M. Zhao, X. Xu, J. Wang, and Y. Yao, "Distributed wireless communication system: A new architecture for future public wireless access," IEEE Mag. Commun., vol. 41, no. 3, pp. 108-113, March 2003.

[25] T. Gong, N. Shlezinger, S. S. Ioushua, M. Namer, Z. Yang, and Y. C. Eldar, "Rf chain reduction for MIMO systems: A hardware prototype," IEEE Systems Journal, pp. 1-12, 2020.

[26] A. Alkhateeb, G. Leus, and R. W. Heath, "Limited feedback hybrid precoding for multi-user millimeter wave systems," vol. 14, no. 11, pp. 6481-6494, 2015.

[27] O. E. Ayach, S. Rajagopal, S. Abu-Surra, Z. Pi, and R. W. Heath, "Spatially sparse precoding in millimeter wave MIMO systems," IEEE Trans. on Wireless Commun., vol. 13, no. 3, pp. 1499-1513, 2014.

[28] V. Raghavan and A. M. Sayeed, "Sublinear capacity scaling laws for sparse MIMO channels," IEEE Trans. on Inf. Theory, vol. 57, no. 1, pp. 345-364, 2011.

[29] A. Forenza, D. J. Love, and R. W. Heath, "Simplified spatial correlation models for clustered MIMO channels with different array configurations," IEEE Trans. Veh. Technol., vol. 56, no. 4, pp. 1924-1934, 2007.

[30] W. Tan, S. D. Assimonis, M. Matthaiou, Y. Han, X. Li, and S. Jin, "Analysis of different planar antenna arrays for mmWave massive MIMO systems," in IEEE Veh. Technol. Conf. (VTC'85 Spring), 2017, pp. 1-5.

[31] B. Ai, K. Guan, G. Li, and S. Mumtaz, "Chapter 8-mmwave massive MIMO channel modeling," in mmWave Massive MIMO, S. Mumtaz, J. Rodriguez, and L. Dai, Eds. Academic Press, 2017, pp. 169-194.

[32] S. Boyd and L. Vandenberghe, Convex Optimization. Cambridge University Press, 2004.

[33] C. A. Balanis, Antenna theory: Analysis and Design, 4th ed. Hoboken, NJ: John Wiley, 2016.

[34] M. S. Ali, H. Tabassum, and E. Hossain, "Dynamic user clustering and power allocation for uplink and downlink non-orthogonal multiple access (NOMA) systems," IEEE Access, vol. 4, pp. 6325-6343, 2016.

[35] K. I. Ahmed and E. Hossain, "A deep Q-learning method for downlink power allocation in multi-cell networks," 2019.

[36] R. Sutton and A. Barto, Reinforcement Learning: An Introduction. The MIT Press Cambridge, Massachusetts London, England., 2017.

[37] O. P. Ronald L. Graham, Donald E. Knuth, Concrete Mathematics. Addison-Wesley, Reading MA, 1988.

[38] V. Mnih and et. al., "Playing atari with deep reinforcement learning," 2013.

[39] G. Rummery, M. Niranjan, and U. of Cambridge. Engineering Department, On-line Q-learning Using Connectionist Systems, ser. CUED/F-INFENG/TR., University of Cambridge, Department of Engineering, 1994.

[40] R. Williams, "Simple statistical gradient-following algorithms for reinforcement learning," in Machine Learning, 1992, pp. 229-256.

[41] V. Mnih and et. al., "Asynchronous methods for deep reinforcement learning," 2016.

[42] R. Bellman, "On the theory of dynamic programming," Proc. of the National Academy of Sciences, vol. 38, no. 8, pp. 716-719, 1952.

[43] P. Christodoulou, "Soft actor-critic for discrete action settings," 2019.

[44] C. G. Broyden, "A class of methods for solving nonlinear simultaneous equations," 1965.

[45] T. Lillicrap and et al., "Continuous control with deep reinforcement learning," arXiv preprint arXiv: 1509.02971, 2015.

[46] T. Haarnoja, A. Zhou, P. Abbeel, and S. Levine, "Soft Actor-Critic: Off-Policy Maximum Entropy Deep Reinforcement Learning with a Stochastic Actor," arXiv e-prints, p. arXiv: 1801.01290, Jan. 2018.

[47] B. Ziebart, "Modeling purposeful adaptive behavior with the principle of maximum causal entropy," Ph.D. dissertation, USA, 2010.

[48] S. Kullback and R. A. Leibler, "On information and sufficiency," Ann. Math. Statist., vol. 22, no. 1, pp. 79-86, 03 1951.

Tables

TABLE I

Definitions of major system model parameters

| Parameter | Definition |
| --- | --- |
| eAP | Enhanced Access Point |
| ECP | Edge Cloud Processor |
| ISNI | Inter-Subnetwork Interference |
| IUI | Intra-UE Interference |
| NCC | Network Cloud Controller |
| B* | Hermitian transpose of a matrix B |
| BT | Transpose of a matrix B |
| $H_{k_n m_n}$ | CSI for the link $m_n \to k_n$ |
| M | Number of eAPs |
| a | Number of antennas per eAP |
| K | Number of UEs |
| u | Number of antennas per UE |
| N | Number of cell-free subnetworks |
| L | Number of mmWave paths |
| Cj | j-th clustering configuration |
| N | Number of possible subnetwork (or cluster) configurations |
| $A_{mn}$ | Beamsteering matrix of eAP $m_n$ |
| $D_{n,j}^A$ | Number of eAPs in the n-th subnetwork |
| $D_{n,j}^U$ | Number of UEs in the n-th Subnetwork |
| $W_{k_n m_n}$ | Beamforming vector for the link $m_n \to k_n$ |
| $m_n$ | m-th eAP in the n-th subnetwork |
| $k_n$ | k-th UE in the n-th subnetwork |
| $H_{k_n m_n}$ | Equivalent CSI for the $m_n \to K_n$ link |
| S | State space of a DRL model |
| s | State vector at time t |
| s' | State vector at time t + 1 |
| r | Immediate reward of a DRL agent |
| A | Action space of DRL model |
| a | Action vector at time t |
| a' | Action vector at time t + 1 |

TABLE II

DRL model for network partitioning

| Clustering Environment Variables | Network Partitioning System Equivalence |
|---|---|
| State $s_c = \{s_{c,1}, \ldots, s_{c,N}\}$ | $\left\{\prod_{t=1}^{\tau}\prod_{i_1=1}^{D^U_{1,j}} \gamma_{i_1}^{\{C_j\}}(t), \ldots, \prod_{t=1}^{\tau}\prod_{i_N=1}^{D^U_{N,j}} \gamma_{i_N}^{\{C_j\}}(t)\right\}$ |
| Reward $r_c$ | $\prod_{t=1}^{\tau}\left(\prod_{n=1}^{N}\left(\sum_{i_n=1}^{D^U_{n,j}} \log\left(1 + \gamma_{i_n}^{\{C_j\}}(t)\right)\right)\right)$ |
| Action $a_c$ | $C_j = \{\{C_{1,j}^A, C_{1,j}^U\}, \ldots, \{C_{N,j}^A, C_{N,j}^U\}\}$ |

TABLE III

DRL model for hybrid beamforming in subnetwork n

| Beamforming Environment Variables | Network Beamforming System Equivalence model for hybrid beamforming in subnetwork n |
|---|---|
| State $s_b = \{s_{b,1_n}, \ldots, s_{b,D^U_{n,j}}\}$ | $\{\gamma_1^{\{C_j\}}, \ldots, \gamma_{D_{n,j}^U}^{\{C_j\}}\}$ (Involving Digital Beamforming) |
| Reward $r_b$ | $\sum_{m_n=1}^{D^A_{n,j}}\left(\sum_{k_n=1}^{D^U_{n,j}}\left\|\delta_{k_n}^V \sum_{k_n m_n} \mathcal{A}^V_{m_n}\right\|^2 + \sum_{l=1,l\neq n}^{N}\sum_{k_l=1}^{D^U_{l,j}}\left\|(t-1)\sum_{k_l m_n} \mathcal{A}^+_{m_n}\right\|^2\right)$ |
| Action $a_b$ | $\{\delta_{k_n}, \mathcal{A}_{m_n}\}_{k_n=1,\ldots,D^U_{n,j}}^{m_n=1,\ldots,D^A_{n,j}}$ |

TABLE IV

Complexity of different DRL models for clustering

| DRL Agent | Inference FLOPS | Convergence |
|---|---|---|
| Conventional solution | $\Theta(M, K, N)$ | Linear convergence |
| SARSA | 32768 + 256 · K + 128 | Slow |
| DDQN | 32768 + 256 · K + 128 | Geometric |
| PG | 32768 + 256 · K + 128 | Sub-linear |
| Actor-Critic | 2(32768 + 256 · K + 128) | Fast |

TABLE V

Complexity of DRL models for beamsteering in the n-th subnetwork

| DRL Agent | Inference FLOPS | Convergence |
|---|---|---|
| Conventional solution. | $O([(D_{n,j}^A \times D_{n,j}^U) \times (a \times u)]^2 q)$ | Linear convergence |
| PG | 32768 + 256 · K + 128 · $M_n$ | Sub-linear |
| DDPG | 32768 + 256 · K + 128 · $M_n$ | Unknown |
| SAC | 32768 + 256 · K + 128 · $M_n$ | Unknown |

TABLE VI

Simulation parameters

| Parameter | Value |
|---|---|
| AWGN PSD at UE | −169 dBm/Hz |
| Path-loss exponent | 2 (outdoor) |
| mmWave carrier frequency, $3 \times 10^8 \lambda$ | 24 GHz (unless specified otherwise) |
| mmWave paths, L | 3 (unless specified otherwise) |
| SIC sensitivity, $P_s$ | 1 dBm |
| # of training episodes | {2000, 4000} |
| # of training steps/episode | 200 |
| Discount factor, $\zeta$ | 0.01 |
| Learning rate, $\alpha$ | 0.001 |

TABLE VII

Numerical results on the performances of different clustering schemes.
(M, K) = (5, 3) and (a, u) = (1, 1) with optimal performance: 2.03786 pbs/Hz

| Agent | Average reward | Inference mode Fixed H | Inference mode Variable H | Training duration (2000 episodes) |
|---|---|---|---|---|
| PG trained by fixed H | 1.7607 bps/Hz | 1.5626 bps/Hz | 1.4841 bps/Hz | 15.4072 Mins |
| PG trained by varying H | 1.6090 bps/Hz | 1.5592 bps/Hz | 1.5332 bps/Hz | 15.0098 Mins |
| DDQN trained by fixed H | 1.7308 bps/Hz | 1.5802 bps/Hz | 1.5355 bps/Hz | 16.5467 Mins |
| DDQN trained by varying H | 1.5579 bps/Hz | 1.5321 bps/Hz | 1.4654 bps/Hz | 14.0558 Mins |
| SARSA trained by fixed H | 1.4733 bps/Hz | 1.4376 bps/Hz | 1.5153 bps/Hz | 18.2317 Mins |
| SARSA trained by varying H | 1.5862 bps/Hz | 1.5047 bps/Hz | 1.5072 bps/Hz | 16.3313 Mins. |

TABLE VII-continued

Numerical results on the performances
of different clustering schemes.
(M, K) = (5, 3) and (a, u) = (1, 1) with
optimal performance: 2.03786 pbs/Hz

| Agent | Average reward | Inference mode Fixed H | Inference mode Variable H | Training duration (2000 episodes) |
|---|---|---|---|---|
| AC trained by fixed H | 1.4186 bps/Hz | 1.5876 bps/Hz | 1.4991 bps/Hz | 15.3618 Mins |
| AC trained by varying H | 1.6084 bps/Hz | 1.5664 bps/Hz | 1.4919 bps/Hz | 15.5362 Mins |

The invention claimed is:

1. A wireless communication network for a plurality of user devices distributed in a geographical area comprising:
a plurality of access points having antennas and configured to wirelessly communicate with the user devices, wherein each of the access points further includes a respective processor, and a respective non-transitory memory that is operatively connected to the respective processor and on which there are stored instructions to be executed;
wherein the access points are arranged at spaced locations across the geographical area;
a central server having another processor, and another non-transitory memory that is operatively connected to said another processor and on which there are stored instructions to be executed, wherein the central server is communicatively connected to the access points and configured to control the wireless communication network;
wherein the access points are grouped, based on channel state information, to form a plurality of communication clusters each in wireless communication with a subset of the user devices in geographically proximal location thereto;
where each communication cluster and the subset of the user devices communicated therewith forms a subnetwork;
wherein the subnetworks are arranged for wireless communication in non-overlapping portions of the geographical area;
wherein the access points of a common subnetwork are configured to wirelessly exchange data with the user devices of the subnetwork using a common frequency range; and
wherein each of the communication clusters comprises an edge computing device formed by one or more of the access points belonging thereto and configured to exchange data with the central server.

2. The wireless communication network of claim 1 wherein main lobes of the antennas of the access points of a common subnetwork are arranged to be directed towards the user devices of the subnetwork.

3. The wireless communication network of claim 1 wherein side lobes of the antennas of the access points of a common subnetwork are arranged to be directed towards the user devices of different subnetworks.

4. The wireless communication network of claim 1 wherein directions of lobes of the antennas of the access points of a common subnetwork are determined by the edge computing device of the subnetwork.

5. The wireless communication network of claim 1 wherein the communication clusters are determined by the central server.

6. The wireless communication network of claim 1 wherein, when at least some of the user devices are mobile, the communication clusters are periodically reformed.

7. The wireless communication network of claim 1 wherein the communication clusters are configured to use different frequency ranges for communication with the subsets of the user devices.

8. The wireless communication network of claim 1 wherein the communication clusters are formed by selecting, from all possible configurations of subnetworks including at least one of the access points and at least one of the user devices, a single one of the configurations based on an optimal set of analog beamsteering, digital beamforming and analog combining matrices.

9. The wireless communication network of claim 8 wherein the optimal set of the analog beamsteering, digital beamforming and analog combining matrices is obtained by solving a combinatorial optimization problem.

10. The wireless communication network of claim 9 wherein the combinatorial optimization problem is solved using a deep reinforcement learning-cumulative-convex solution.

11. A method of forming a cell-free communication network having a central server and a plurality of distributed access points configured to communicate therewith and to wirelessly communicate with a plurality of distributed user devices, the method comprising:
based on communication channels formable between the access points and the user devices, grouping the access points into a plurality of communication clusters arranged to communicate with subsets of the user devices in geographically proximal location thereto, wherein each pairing of one of the communication clusters and a corresponding one of the subsets of the user devices in communication therewith forms a subnetwork; and
selecting one or more of the access points of a common subnetwork as an edge computing device thereof, wherein the edge computing device is in communication with the central server for exchanging data and configuring the cell-free communication network.

12. The method of claim 11 wherein grouping the access points into a plurality of communication clusters comprises selecting, from all possible configurations of subnetworks including at least one of the access points and at least one of the user devices, a single one of the configurations based on an optimal set of analog beamsteering, digital beamforming and analog combining matrices.

13. The method of claim 12 further including solving a combinatorial optimization problem to obtain the optimal set of the analog beamsteering, digital beamforming and analog combining matrices.

14. The method of claim 13 wherein solving a combinatorial optimization problem comprises applying a deep reinforcement learning-cumulative-convex solution to the combinatorial optimization problem.

15. The method of claim 11 wherein grouping the access points into a plurality of communication clusters comprises solving a combinatorial optimization problem to select a prescribed configuration of subnetworks, which includes selecting a prescribed arrangement of antenna beams in each subnetwork, wherein solving a combinatorial optimization problem comprises applying a deep reinforcement learning algorithm thereto.

16. The method of claim 15 wherein applying a deep reinforcement learning algorithm comprises applying a first deep learning agent of the algorithm to solve for the prescribed configuration of subnetworks and outputting an action thereof to an environment of the first deep learning agent in which a second deep learning agent of the algorithm is applied to solve for the prescribed arrangement of antenna beams in each subnetwork of the configuration output by the first deep learning agent.

17. The method of claim 16 wherein applying the second deep learning agent to solve for the prescribed arrangement of antenna beams in each subnetwork comprises applying the second deep learning agent to solve an analog beam-steering problem and outputting an action thereof to an environment of the second deep learning agent in which a convex optimization problem associated with digital beamforming is solved.

18. The method of claim 16 wherein the second deep learning agent is applied over a continuous action space.

19. The method of claim 11 wherein, when at least some of the user devices are mobile, grouping the access points into a plurality of communication clusters is periodically repeated.

* * * * *